(12) United States Patent
Takanashi

(10) Patent No.: US 10,711,382 B2
(45) Date of Patent: Jul. 14, 2020

(54) SELF LAUNDRY SYSTEM

(71) Applicant: wash-plus Co., Ltd., Urayasu-shi, Chiba (JP)

(72) Inventor: Kentaro Takanashi, Urayasu (JP)

(73) Assignee: wash-plus Co., Ltd., Urayasu-shi, Chiba (JP)

(*) Notice: Subject to any disclaimer, the term of this patent is extended or adjusted under 35 U.S.C. 154(b) by 258 days.

(21) Appl. No.: 15/765,252

(22) PCT Filed: Oct. 16, 2017

(86) PCT No.: PCT/JP2017/037367
§ 371 (c)(1),
(2) Date: Mar. 31, 2018

(87) PCT Pub. No.: WO2019/077649
PCT Pub. Date: Apr. 25, 2019

(65) Prior Publication Data
US 2019/0382940 A1 Dec. 19, 2019

(51) Int. Cl.
*D06F 34/28* (2020.01)
*H04W 4/80* (2018.01)
*D06F 39/14* (2006.01)
*D06F 95/00* (2006.01)
*G06Q 50/10* (2012.01)
*G07F 17/20* (2006.01)
*H04M 11/00* (2006.01)
(Continued)

(52) U.S. Cl.
CPC .............. *D06F 34/28* (2020.02); *D06F 33/00* (2013.01); *D06F 39/14* (2013.01); *D06F 58/30* (2020.02); *D06F 95/00* (2013.01);
*G06Q 50/10* (2013.01); *G07F 17/20* (2013.01); *H04M 11/00* (2013.01); *H04W 4/80* (2018.02)

(58) Field of Classification Search
CPC .......... D06F 34/28; D06F 58/30; D06F 33/00; D06F 39/14; D06F 95/00; H04W 4/80; G06Q 50/10; G07F 17/20; H04M 11/00
USPC ........................................................ 34/486
See application file for complete search history.

(56) References Cited

U.S. PATENT DOCUMENTS 5,386,362 A * 1/1995 Keret ..................... G07F 5/18
700/17
5,709,040 A * 1/1998 Horwitz ................. D06F 58/22
34/565

(Continued)

FOREIGN PATENT DOCUMENTS

JP WO2019077649 A1 * 11/2019 ............ H04Q 9/00
WO WO-2019077649 A1 * 4/2019 ............ D06F 95/00

*Primary Examiner* — Stephen M Gravini

(57) ABSTRACT

A self laundry system that enhances the convenience of a user is provided. When an operation command output control starts, in step S1, a server 30 associates a user terminal 51 and a laundry apparatus 20. In step S2, an identification signal is sent to the user terminal 51. After completing the charging in step S8, in step S9, the server 30 determines whether a "lock the cover" button 76 is touched. In step S11, the server 30 determines whether a "window to be opaque" button 77 is touched. Then, in step S13, the server 30 outputs an operation start command to the laundry apparatus 20, and ends an operation start command control. The laundry apparatus 20, to which the operation start command is inputted, starts operation in an operation mode selected by the user.

9 Claims, 27 Drawing Sheets

(51) Int. Cl.
    *D06F 33/00*    (2020.01)
    *D06F 58/30*    (2020.01)

(56) References Cited

U.S. PATENT DOCUMENTS

| | | | | |
|---|---|---|---|---|
| 5,757,643 | A * | 5/1998 | Kuroda | G05B 19/0423 |
| | | | | 700/9 |
| 5,799,281 | A * | 8/1998 | Login | G06Q 30/0283 |
| | | | | 700/90 |
| 5,822,883 | A * | 10/1998 | Horwitz | D06F 58/22 |
| | | | | 34/494 |
| 6,424,949 | B1 * | 7/2002 | Deaton | G06Q 20/387 |
| | | | | 705/14.25 |
| 6,850,149 | B2 * | 2/2005 | Park | H04M 1/72533 |
| | | | | 340/12.4 |
| 6,862,496 | B2 * | 3/2005 | Fukuoka | G06Q 20/027 |
| | | | | 235/379 |
| 7,096,601 | B2 * | 8/2006 | Lyu | D06F 29/00 |
| | | | | 34/595 |
| 7,146,749 | B2 * | 12/2006 | Barron | D06F 35/00 |
| | | | | 34/596 |
| 7,373,737 | B2 * | 5/2008 | Lyu | D06F 29/00 |
| | | | | 34/595 |
| 7,383,644 | B2 * | 6/2008 | Lyu | D06F 29/00 |
| | | | | 34/596 |
| 7,559,156 | B2 * | 7/2009 | Renzo | D06F 58/04 |
| | | | | 34/595 |
| 7,574,269 | B2 * | 8/2009 | Cenedese | D06F 33/02 |
| | | | | 700/17 |
| 8,528,610 | B2 * | 9/2013 | Kuehl | F16L 37/26 |
| | | | | 141/349 |
| 8,544,187 | B2 * | 10/2013 | Choi | D06F 58/28 |
| | | | | 34/407 |
| 8,707,581 | B2 * | 4/2014 | Quaroni | D06F 39/12 |
| | | | | 34/604 |
| 9,013,320 | B2 * | 4/2015 | Ha | G05B 23/0205 |
| | | | | 340/679 |
| 9,200,840 | B2 * | 12/2015 | Choi | D06F 58/28 |
| 9,450,811 | B2 * | 9/2016 | Dal Bello | G05B 23/02 |
| 9,951,465 | B1 * | 4/2018 | Herschler | D06F 58/04 |
| 9,979,560 | B2 * | 5/2018 | Kim | H04L 12/2825 |
| 10,094,065 | B2 * | 10/2018 | Kim | D06F 58/28 |
| 10,121,029 | B2 * | 11/2018 | Rabb | H04W 4/30 |
| 10,174,452 | B2 * | 1/2019 | Choi | D06F 58/28 |
| 10,325,269 | B2 * | 6/2019 | Kwon | D06F 33/02 |
| 10,400,385 | B2 * | 9/2019 | Brown | D06F 58/02 |
| 10,443,182 | B2 * | 10/2019 | Adkins | D06F 58/28 |
| 10,487,443 | B1 * | 11/2019 | D'Anna | F26B 3/347 |
| 10,526,745 | B2 * | 1/2020 | Dunn | D06F 58/02 |
| 2013/0201316 | A1 * | 8/2013 | Binder | H04L 67/12 |
| | | | | 348/77 |

\* cited by examiner

SELF LAUNDRY SYSTEM

FIELD OF THE INVENTION

The present invention relates to a self laundry system, and more particularly to a technology for improving the convenience and the like of users.

BACKGROUND OF THE INVENTION

After putting coins into a coin machine, a user who comes to a coin-based self laundry operates various setting buttons and start buttons disposed on a washing machine and a dryer to make washing and drying according to the quantity and type of clothing (refer to Patent Document 1).

While waiting for the washing machine and the dryer to finish the operation, the user sometimes goes to the store or restaurant outside for shopping or dining (refer to Patent Document 2).

EXISTING TECHNICAL DOCUMENTS

Patent Documents

Patent Document 1: Japanese patent publication No. 2001-129300

Patent Document 2: Japanese patent publication No. 2006-262942

Problems to be Solved by the Present Invention

An objective of the present invention is to provide a coin laundry that is easier for a user to use.

As an example of a more specific topic, there are the following.

As listed below, there are various problems that need to be improved for a coin laundry.

When the washing machine and the dryer do not operate due to clogging of the coin input unit or the like, a user requests a refund from the installer through a telephone in the store, etc. However, it will take a lot of labor and time to deal with such claims.

Since there is a large amount of coins accumulated in the washing machine and the dryer, there are concerns such as theft.

It is difficult for female users to go out of the store during the dryer operation because of concerns about the underwear, etc., being dried, to be peeked from a glass window of a cover or stolen.

Because a user outside the store cannot be informed that washing and drying have been completed, the storage time is longer and the utilization rate of the laundry equipment is reduced.

In order to solve these problems, the inventor thought of the following system. By importing dedicated application software for a portable terminal, a user can perform various operations of laundry equipment using the portable terminal, and the portable terminal is notified at the end of washing and drying.

However, even in such a system, there are the following concerns. In a large-scale coin laundry, a plurality of laundry apparatuses are processed by a plurality of users simultaneously in parallel, therefore, a plurality of users try to operate the same laundry apparatus, etc., due to input errors, etc., to the portable terminal.

The present invention has been made in view of the above-described circumstances, and an objective of the present invention is to provide a self laundry system for improving the convenience of users.

SUMMARY OF THE INVENTION

According to a first aspect of the present invention, a self laundry system includes: a plurality of laundry apparatuses disposed in a laundry store, having at least one of a washing function and a drying function, and each having an inherent identification mark; and a control device that communicates with a portable terminal of a user and controls operation of the laundry apparatus according to its communication results. The control device has: an association means for associating the portable terminal with one of the laundry apparatuses based on an identification signal from the portable terminal; and an operation command output means for outputting an operation command to the laundry apparatus associated with the portable terminal based on an operation request signal from the portable terminal.

Preferably, input of a one-time password inputted to the portable terminal by the user is requested when the association means associates the portable terminal with one of the laundry apparatuses.

Preferably, the identification mark is a two-dimensional code for photographing by the portable terminal.

Preferably, communication between the portable terminal and the control device is performed via the Internet.

Preferably, the laundry apparatus has a locking means for locking a cover. The control device has a locking command means for outputting a cover locking command to the laundry apparatus based on a cover locking request from the portable terminal.

Preferably, the laundry apparatus has a glass window that can be switched transparent/opaque. The control device switches the glass window to opaque based on a request for the window to be opaque from the portable terminal.

Preferably, the control device has an end notification means for sending a notification to the portable terminal about an end of operation of the laundry apparatus.

According to a second aspect of the present invention, a self laundry system includes: a plurality of laundry apparatuses disposed in a laundry store, having at least one of a washing function and a drying function; and a control device that communicates with a user's portable terminal and controls operation of the laundry apparatus according to its communication results. The control device has: an association means to associate the portable terminal with one of the laundry apparatuses; and an operation command output means for outputting an operation command to a laundry apparatus associated with the portable terminal based on an operation request signal from the portable terminal. The association means conducts association between the portable terminal and the laundry apparatus based on very close-range communication. The control device receives an operation request signal inputted from the portable terminal by using a communication means different from the very close-range communication.

Effect of the Invention

According to the present invention, a coin laundry that is easier for a user to use can be provided.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Hereinafter, the first embodiment of the present invention will be described in detail with reference to FIG. 1 to FIG. 13. The first embodiment is characterized in that an operation request signal and the like are sent from a portable terminal to a control device by inputting a one-time password (OTP) and close-range wireless communication, and in that fees are paid by credit cards.

(Configuration of the First Embodiment)

Figure 1:
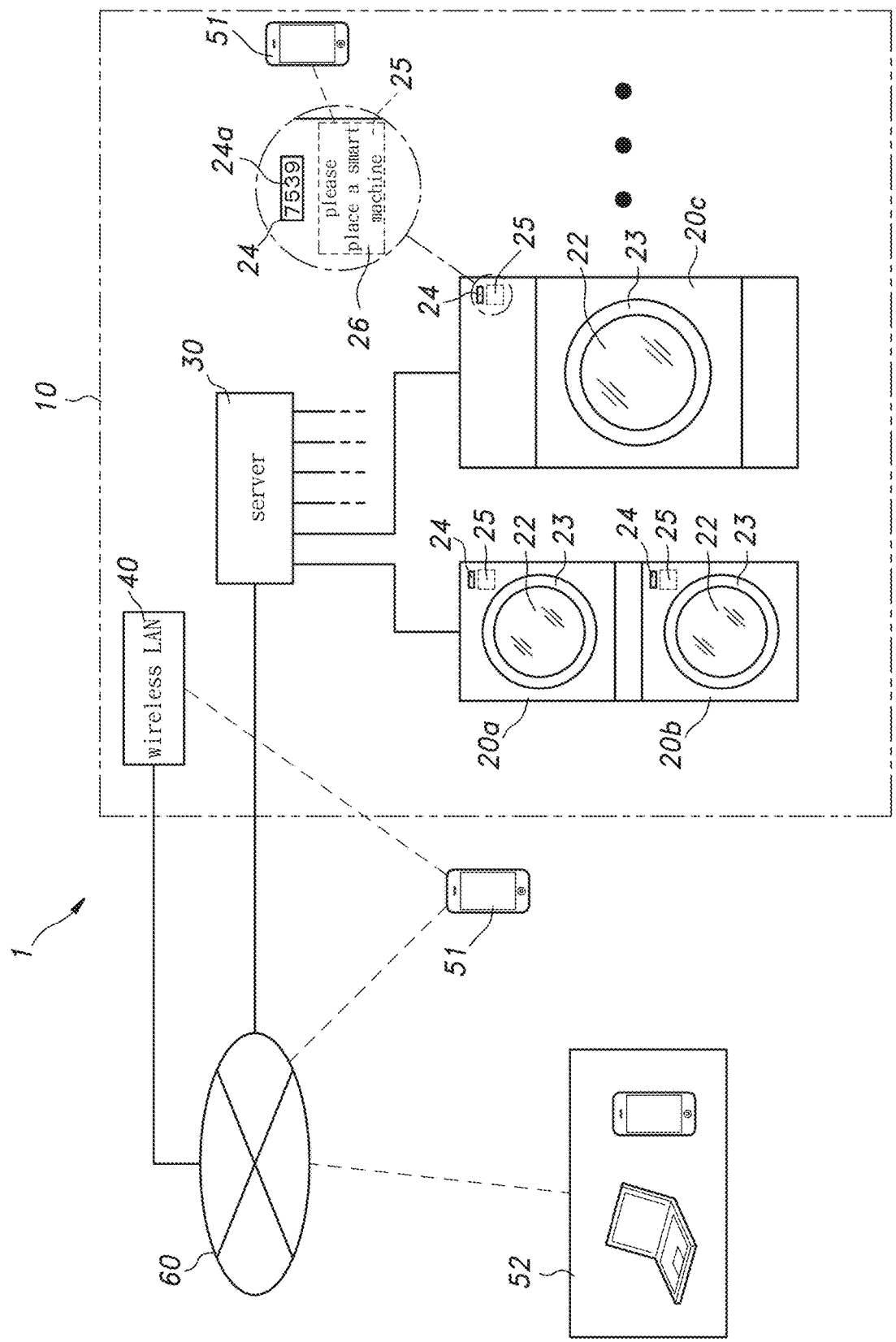
FIG. 1 is a schematic configuration diagram of a self laundry system of a first embodiment.

FIG. 1 is a schematic configuration diagram of a self laundry system of the first embodiment.

Figure 2:
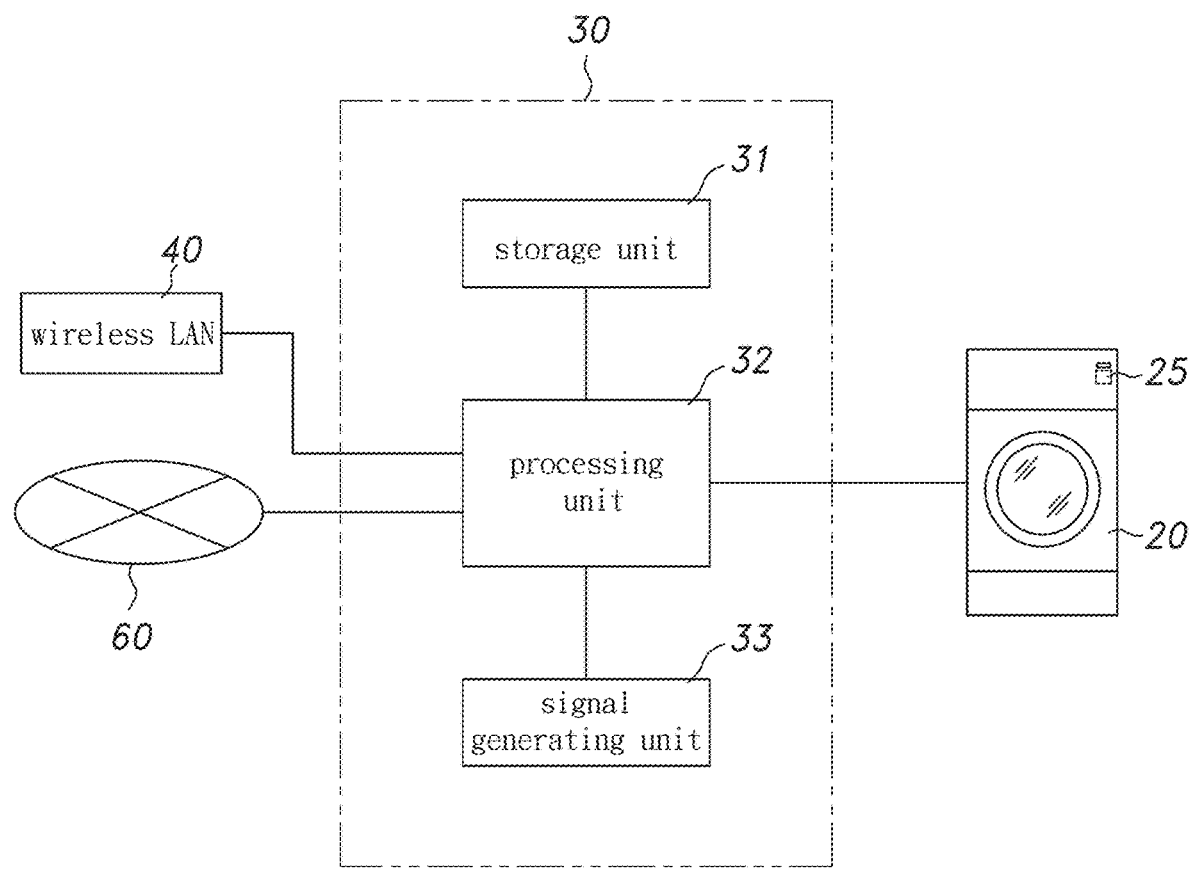
FIG. 2 is a schematic configuration diagram of a server of the first embodiment.

FIG. 2 is a schematic configuration diagram of a server of the first embodiment.

As shown in FIG. 1, a self laundry system 1 of the embodiment has a plurality of laundry apparatuses 20 (20a, 20b, 20c . . . ) and a server 30 (a control device) that controls operation of the laundry apparatuses 20. The laundry apparatuses 20 are comprised of washing machines and dryers and the like, disposed in a laundry store 10.

Each of the laundry apparatuses 20 is individually labeled with a QR code as an inherent identification mark. The QR code is a printed QR code.

In addition, in FIG. 1, although it is "please place a smart machine", in the present embodiment, it is described based on the QR code (a two-dimensional code). Because no matter which one, as long as its terminal can be specified, it is equivalent. Furthermore, even if the content of "please place a smart machine" is changed (for example, "please place a smart phone"), or because of the line feed position, etc., "please place a smart machine" in FIG. 1, each laundry apparatus 20 can also be specified.

Then, each laundry apparatus 20 to which the QR code is affixed can be specified by photographing the QR code with a portable terminal 51 (for example, a smart phone), and via a telephone communication network (the Internet), or the like.

In other words, the portable terminal 51 can be associated with each laundry apparatus 20 to which the QR code is printed.

However, with this method alone, there are following concerns. By copying the QR code, etc., a user can also operate even if not in the laundry store 10.

In order to avoid this situation, each laundry apparatus 20 is provided with a display 24. A one-time password 24a is displayed when the portable terminal 51 is associated with each laundry apparatus 20.

Association processing is done through a user inputting the one-time password 24a on the portable terminal 51. Thus, it can be confirmed that the user is actually in front of the laundry apparatus 20, and that the user is not in front of other laundry apparatus 20 in the laundry store 10, etc.

Furthermore, the one-time password 24a is a randomly generated four-digit combination that changes at a predetermined interval (for example, at 30 second intervals).

For further development, a device-side transceiver 25 for very short-range wireless communication such as FeliCa (registered trademark), etc., is disposed, and preferably, a terminal-side transceiver for very short-range wireless communication is further disposed on the portable terminal 51.

In this case, only by placing the portable terminal 51 at a predetermined position (for example, a mark 26 of "please place a smart machine" in FIG. 1), even if both of the QR code and the one-time password 24*a* are not available, association can also be executed.

Each laundry apparatus 20 is provided with a manually opened and closed type cover 23 having a transparent glass window 22. Each laundry apparatus 20 is provided with an electric locking mechanism (not shown in the figure) for locking the cover 23, and locks the cover 23 in a locked state according to a command from the server 30. The glass window 22 utilizes an instant dimming manner of liquid crystals, and instantly switches between transparent/opaque according to commands from the server 30.

A wireless LAN 40 conforming to the Wi-Fi (registered trademark) standard is provided in the laundry store 10. The portable terminal (a smart phone or the like, hereinafter referred to as a user terminal) 51 of the user in the laundry store 10 is connected to the Internet 60 via the wireless LAN 40 (or 3G line).

The server 30 is connected to the Internet 60 through a wired LAN 41 and communicates with the user terminal 51 and a manager's terminal (personal computer and smart phone, etc., hereinafter referred to as a manager terminal) 52 of the laundry 10 via the Internet 60. In addition, when the user is outside the laundry 10, the user terminal 51 is connected to the Internet 60 via a 3G line.

Further, it goes without saying that communication can be performed using only the telephone communication network (long-distance communication) without using the wireless LAN 40.

As shown in FIG. 2, the server 30 has a storage unit 31 for storing an operation mode and the user information, etc., a processing unit 32 for performing determination processing and signal output based on an input signal, etc., from the user terminal 51, and a signal generating unit 33 that generates an operation command signal to the laundry apparatus 20 and signals to the user terminal 51 and the manager terminal 52 according to determination results of the processing unit 32, and the like.

(The Effect of the First Embodiment)

Figure 3:
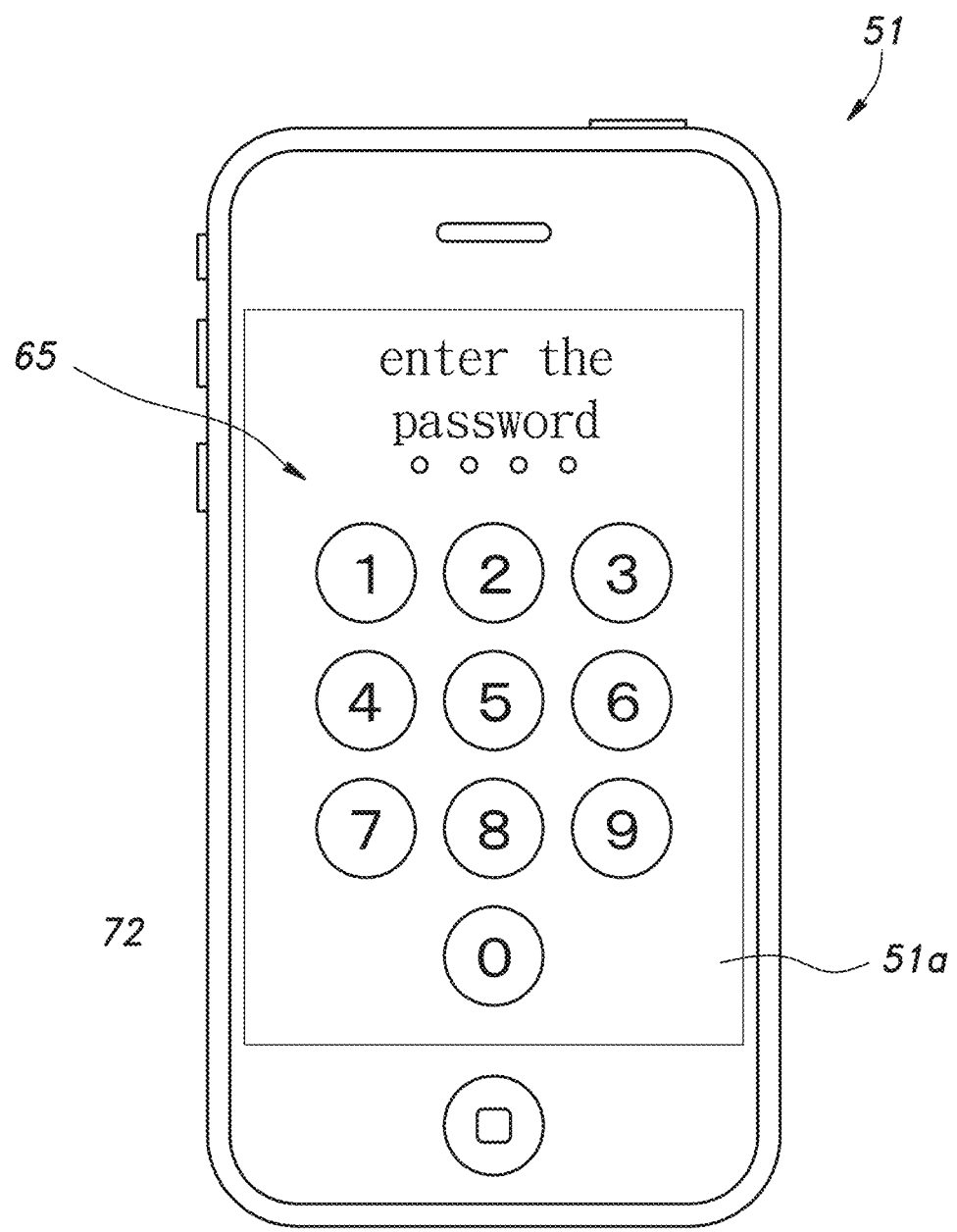
FIG. 3 is a schematic front view of a user terminal displaying a password entry screen in the first embodiment.

FIG. 3 is a schematic front view of a user terminal displaying a password entry screen in the first embodiment.

Figure 4:
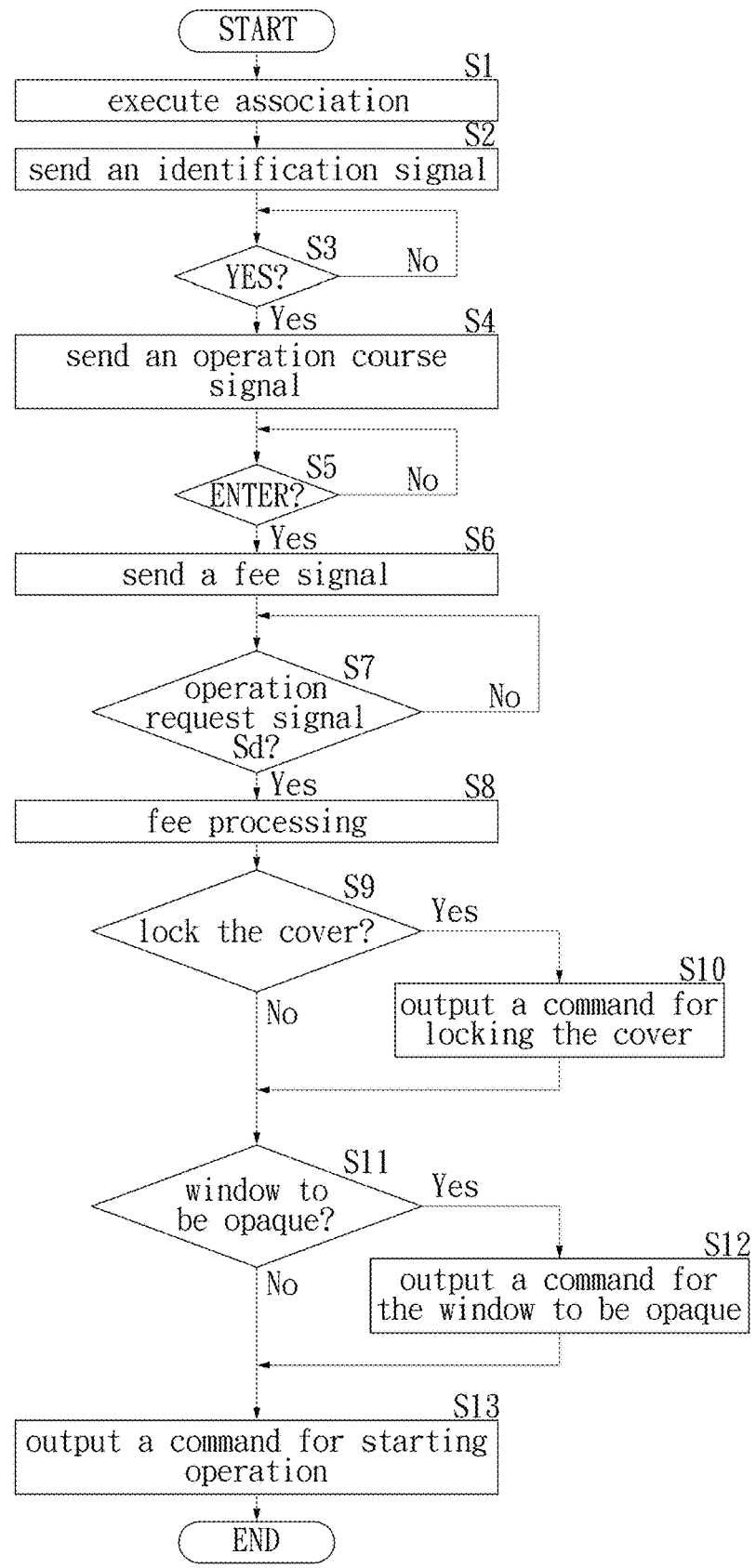
FIG. 4 is a flow chart showing steps of an operation command output control in the first embodiment.

FIG. 4 is a flow chart showing steps of an operation command output control in the first embodiment.

Figure 5:
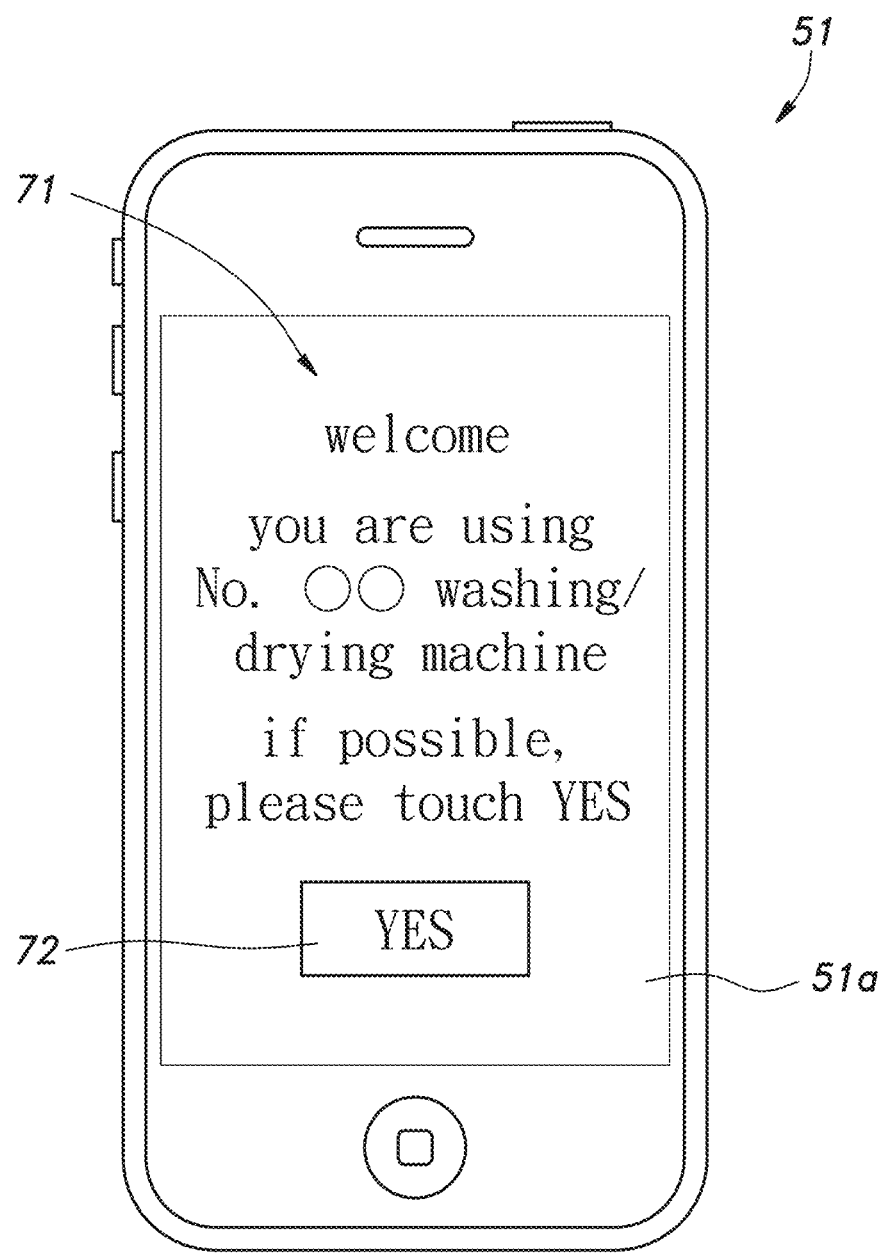
FIG. 5 is a schematic front view of a user terminal receiving an identification signal in the first embodiment.

FIG. 5 is a schematic front view of a user terminal receiving an identification signal in the first embodiment.

Figure 6:
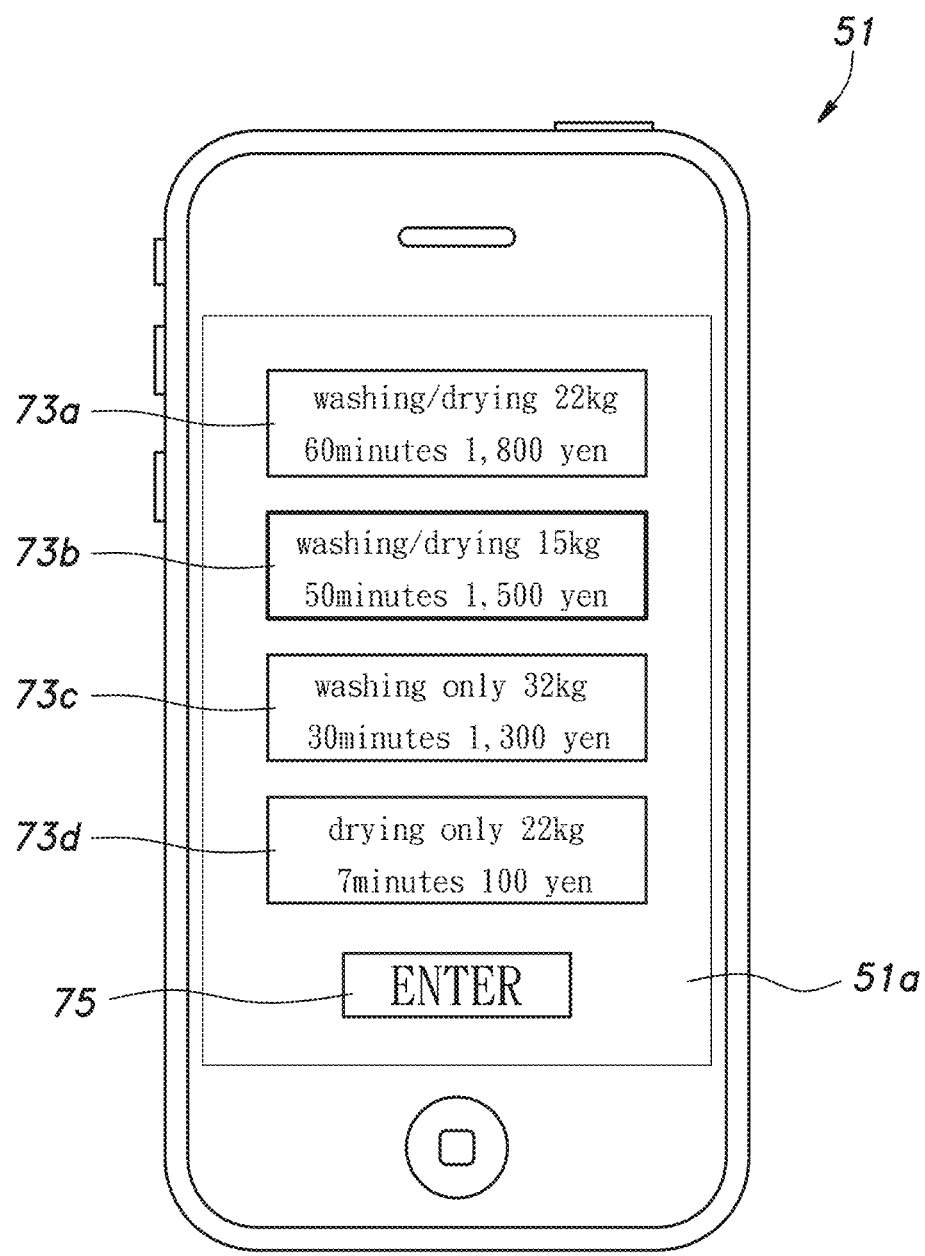
FIG. 6 is a schematic front view of a user terminal receiving an operation course signal in the first embodiment.

FIG. 6 is a schematic front view of a user terminal receiving an operation course signal in the first embodiment.

Figure 7:
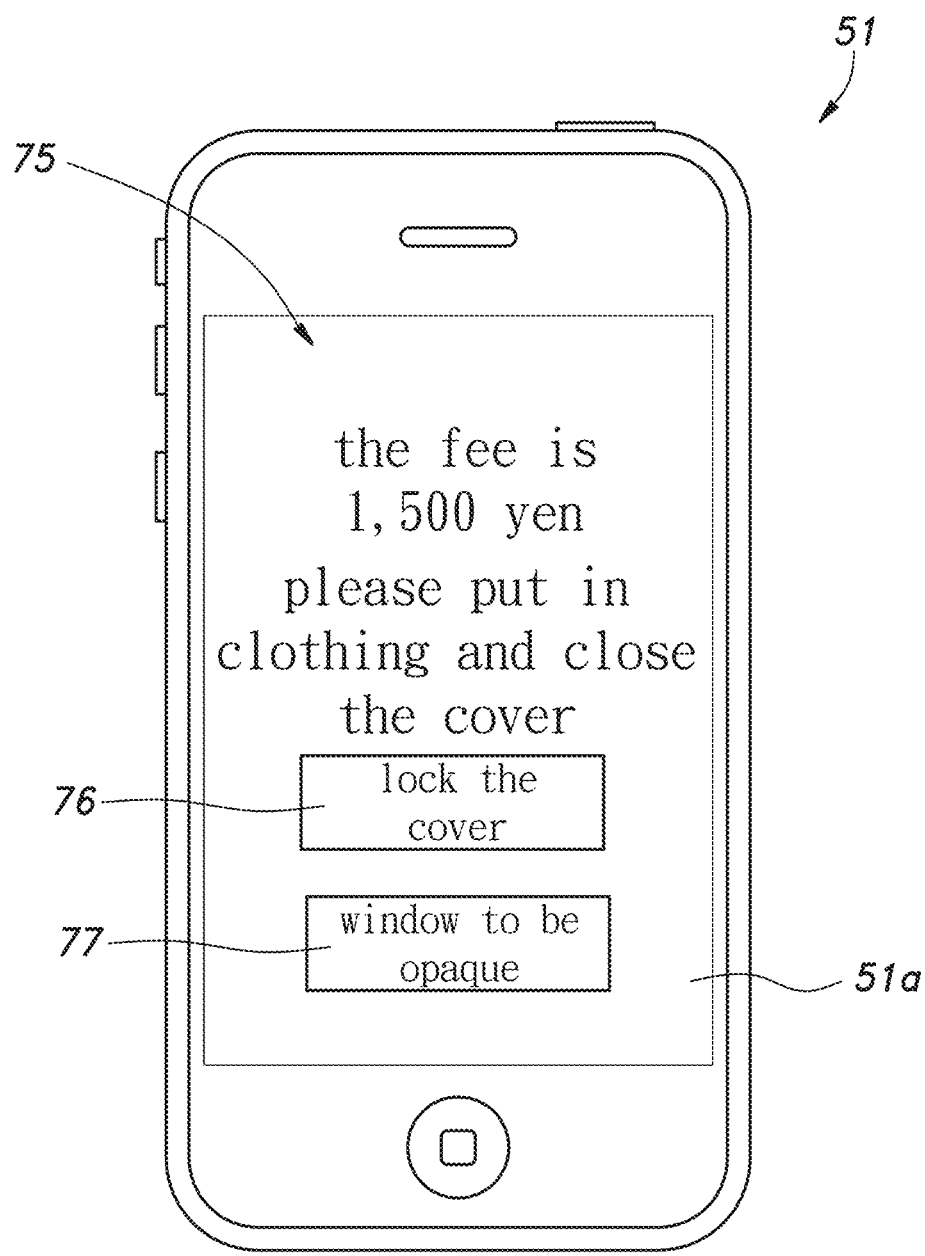
FIG. 7 is a schematic front view of a user terminal receiving a fee signal in the first embodiment.

FIG. 7 is a schematic front view of a user terminal receiving a fee signal in the first embodiment.

Figure 8:
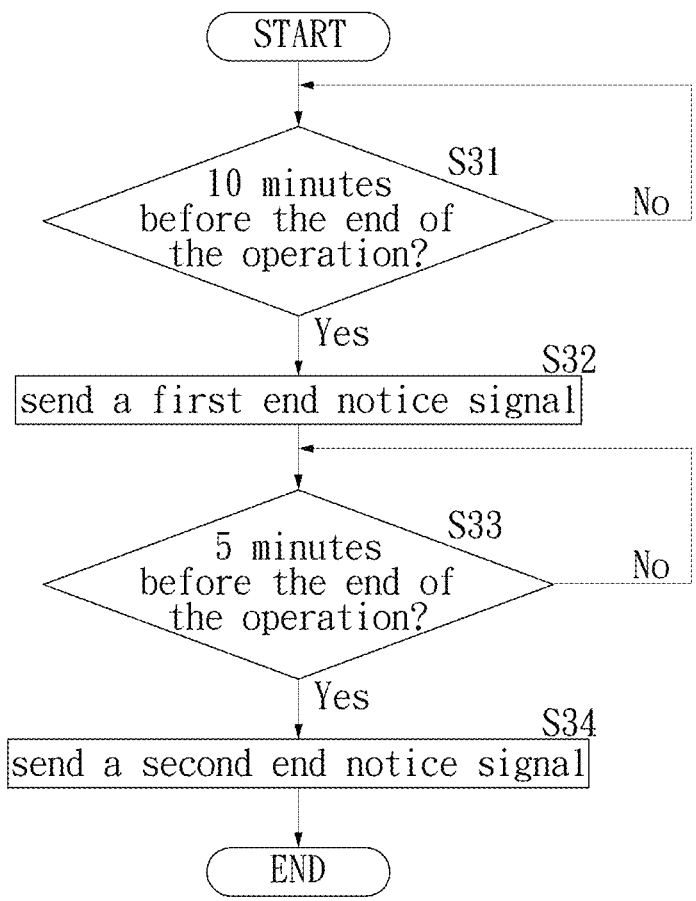
FIG. 8 is a flow chart showing steps of end notice processing in the first embodiment.

FIG. 8 is a flow chart showing steps of end notice processing in the first embodiment.

Figure 9:
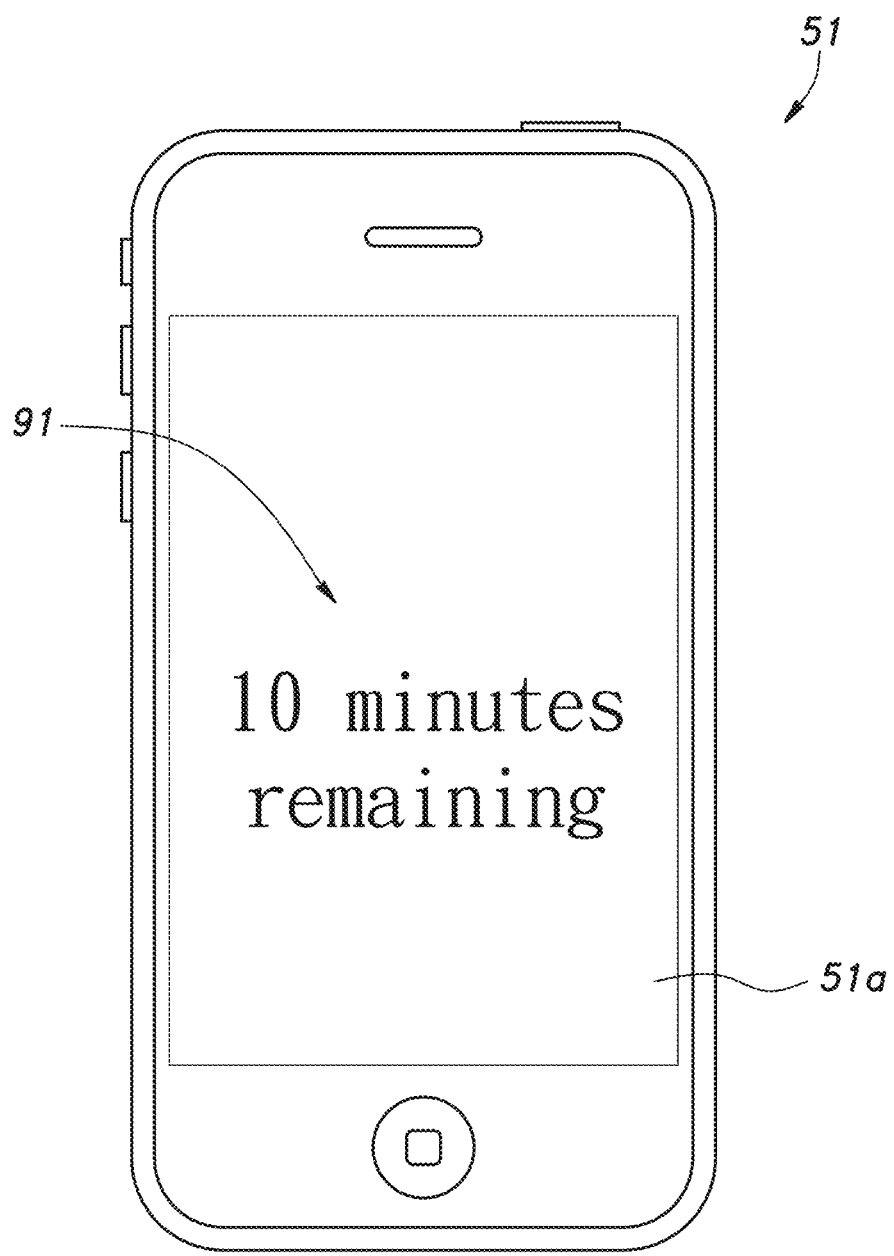
FIG. 9 is a schematic front view of a user terminal receiving a first end notice signal in the first embodiment.

FIG. 9 is a schematic front view of a user terminal receiving a first end notice signal in the first embodiment.

Figure 10:
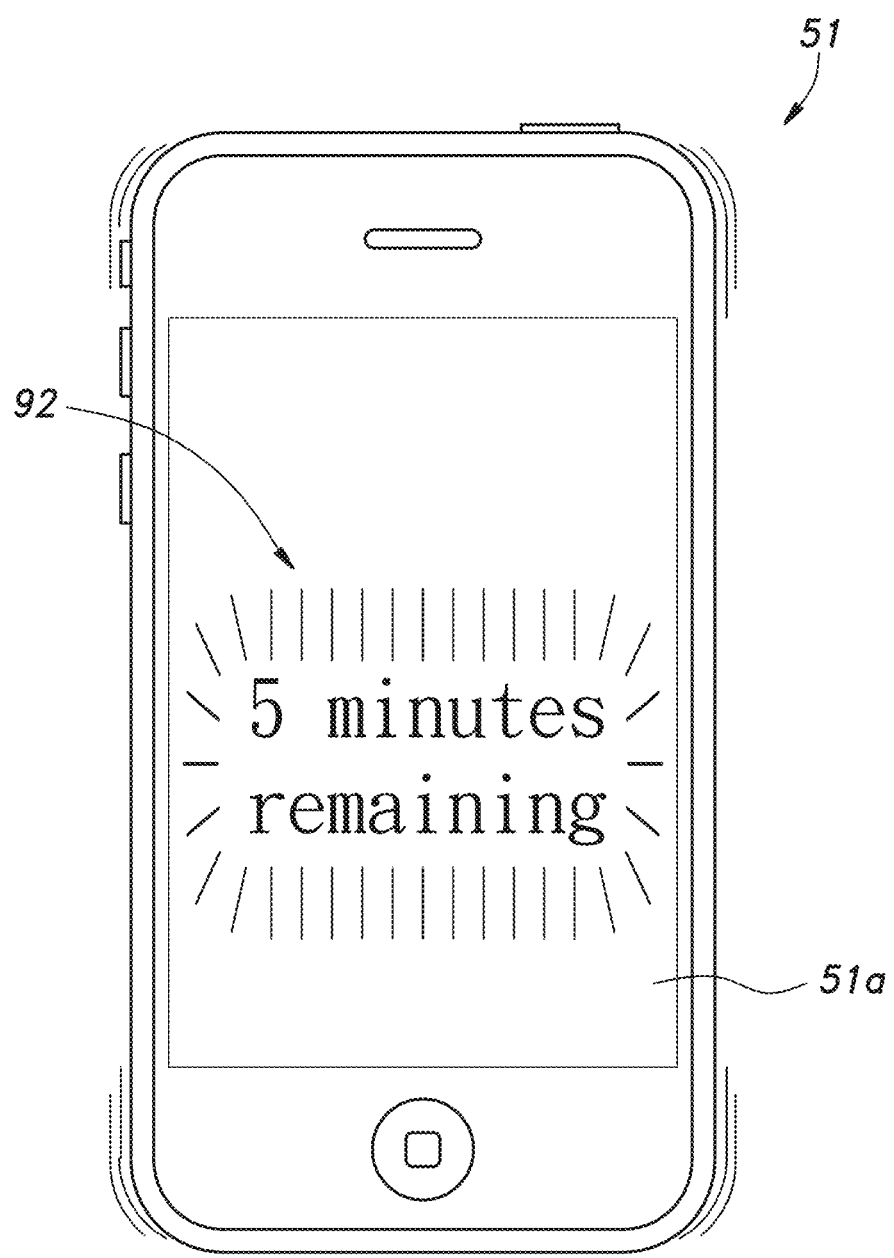
FIG. 10 is a schematic front view of a user terminal receiving a second end notice signal in the first embodiment.

FIG. 10 is a schematic front view of a user terminal receiving a second end notice signal in the first embodiment.

Figure 11:
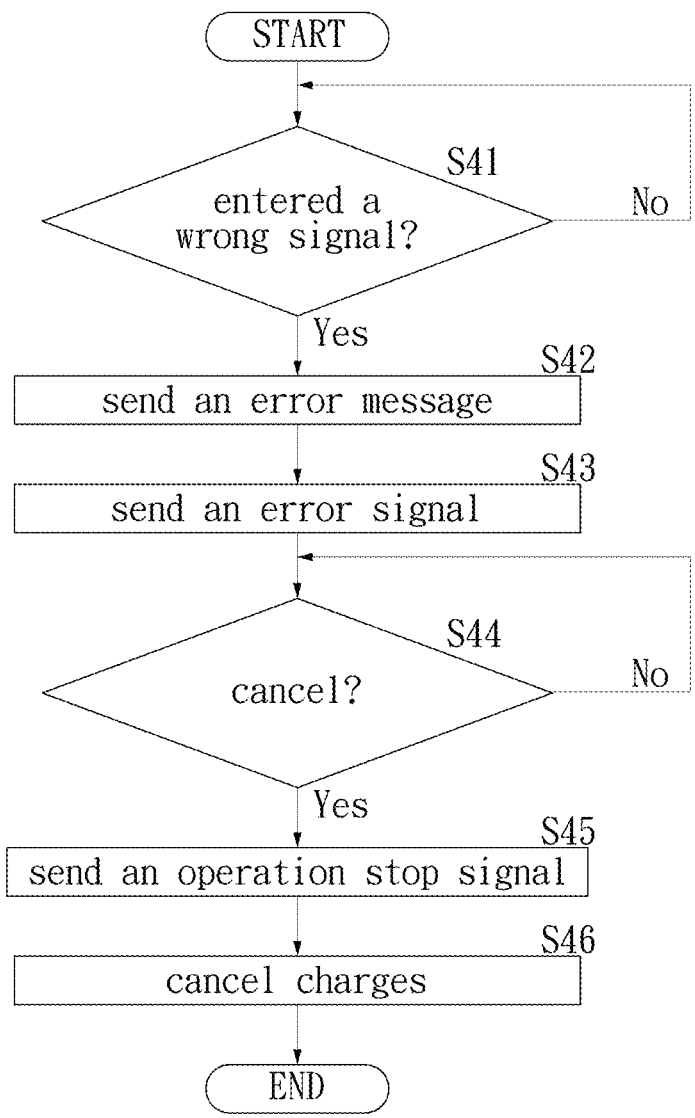
FIG. 11 is a flow chart showing steps of error processing in the first embodiment.

FIG. 11 is a flow chart showing steps of error processing in the first embodiment.

Figure 12:
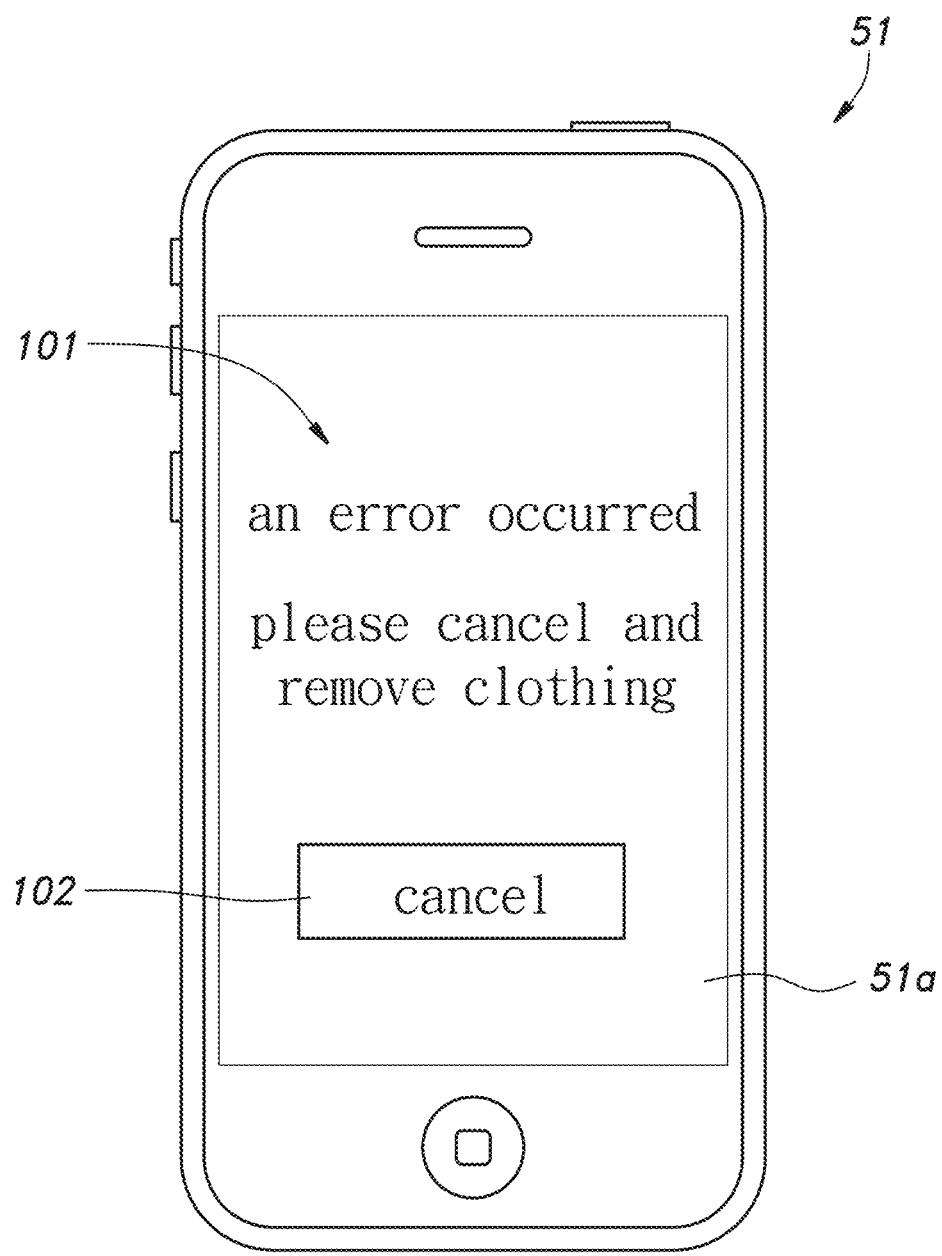
FIG. 12 is a schematic front view of a user terminal receiving an error signal in the first embodiment.

FIG. 12 is a schematic front view of a user terminal receiving an error signal in the first embodiment.

Figure 13:
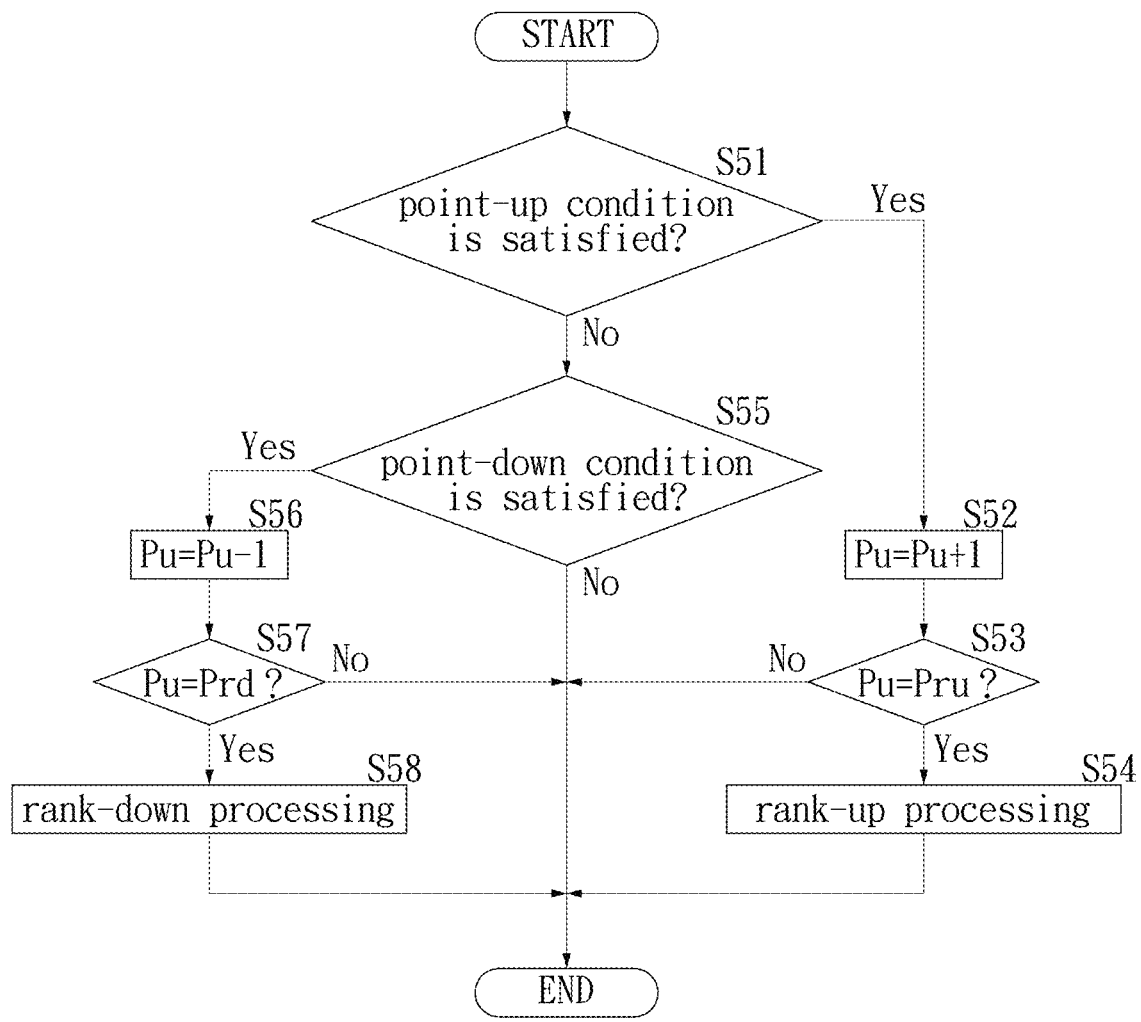
FIG. 13 is a flow chart showing steps of user rank processing in the first embodiment.

FIG. 13 is a flow chart showing steps of user rank processing in the first embodiment.

Figure 14:
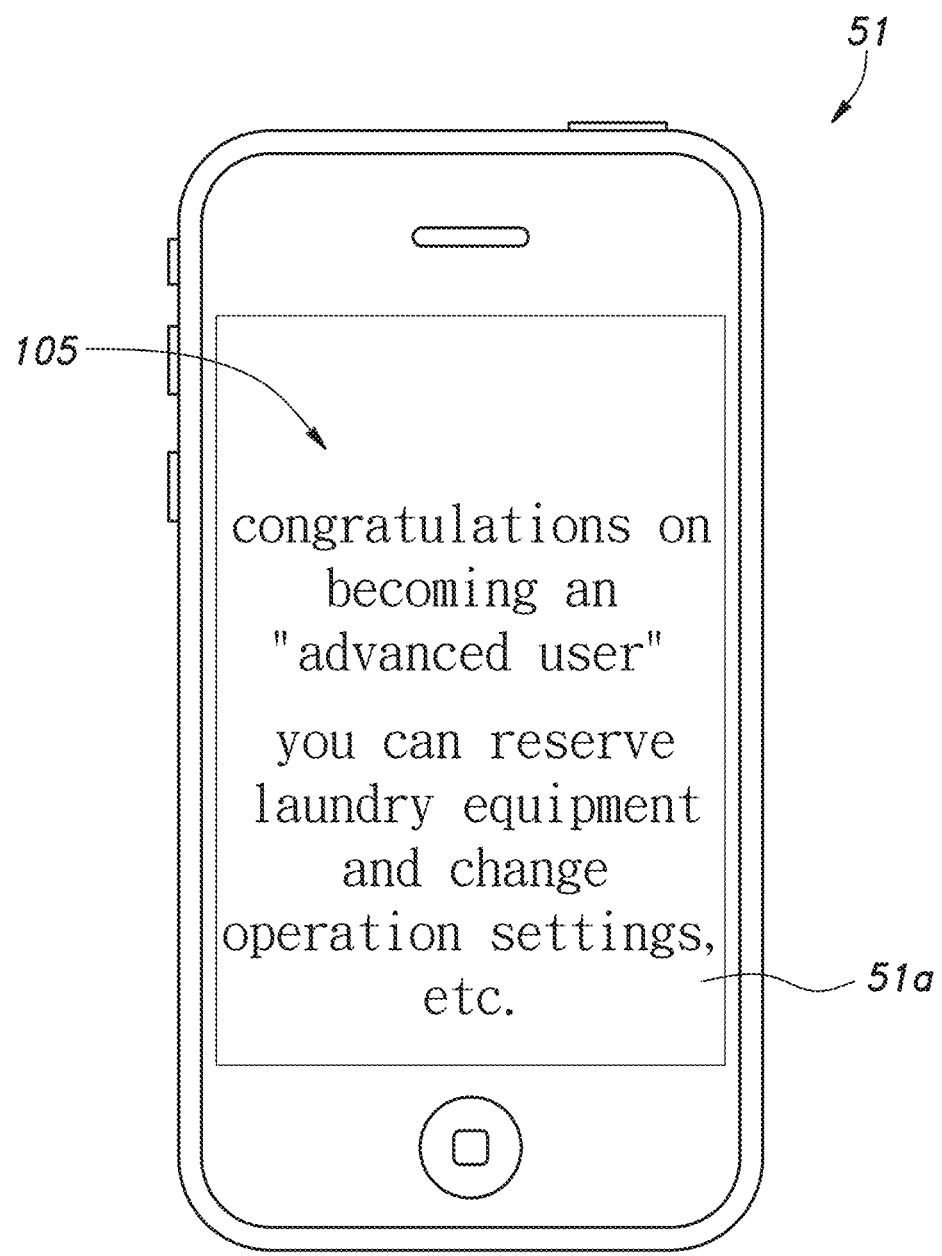
FIG. 14 is a schematic front view of a user terminal receiving a rank-up signal in the first embodiment.

FIG. 14 is a schematic front view of a user terminal receiving a rank-up signal in the first embodiment.

Figure 15:
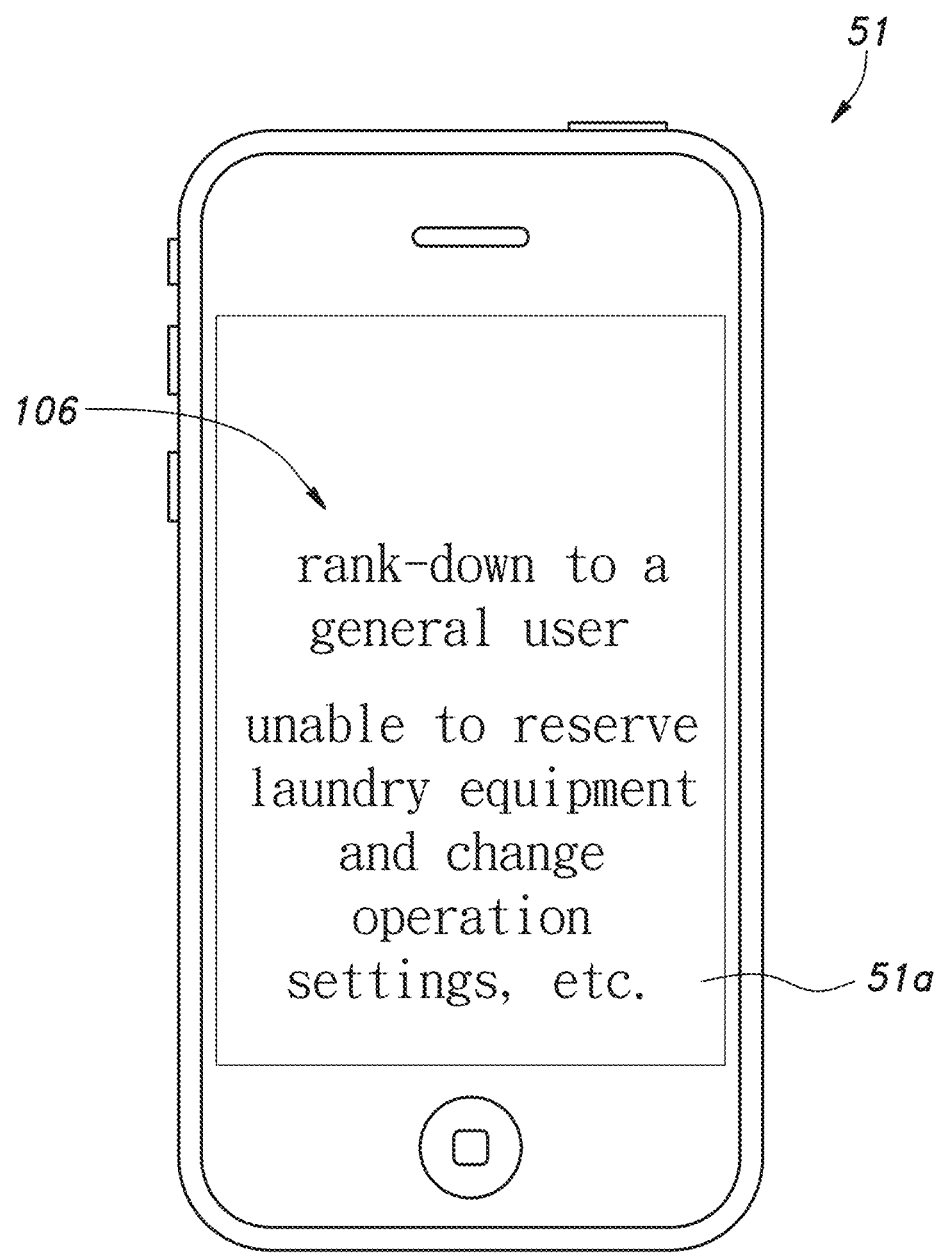
FIG. 15 is a schematic front view of a user terminal receiving a rank-down signal in the first embodiment.

FIG. 15 is a schematic front view of a user terminal receiving a rank-down signal in the first embodiment.

When first using the laundry apparatus 20 of the laundry 10, the user visits the homepage of the laundry 10 at home or in the laundry store 10, and downloads dedicated application software (hereinafter, referred to as a dedicated application) corresponding to the self laundry system 1 to the user terminal 51.

Next, the user uses the user terminal 51 for user registration. The user registration means registering name and address, mobile number, and payment information (credit card information) on the server 30.

The user who comes to the laundry 10 selects the laundry apparatus 20 according to the kind and amount of clothing to be washed or dried. Next, the user uses the user terminal 51 to connect to the Internet via the telephone communication network (or wireless LAN 40) and starts the dedicated application.

Then, a camera or the like of the user terminal 51 is used to photograph the QR code affixed on the selected laundry apparatus 20.

As a result, it is temporarily associated with the laundry apparatus 20 through communication.

Then, as shown in FIG. 3, a password entry screen 65 is displayed on the screen 51*a* of the user terminal 51.

After that, the user enters the one-time password 24*a* displayed on the display 24 of the laundry apparatus 20 on the user terminal 51.

An identification signal Si of the one-time password 24*a* is sent to the laundry apparatus 20 or the control device, thereby completing formal association.

Moreover, as a development form, in the case of using very close-range communication, when the user places the portable terminal 51 on the device-side transceiver 25, the identification signal Si corresponding to the user terminal 51 and the laundry apparatus 20 is sent from the portable terminal 51. The identification signal Si is inputted to the server 30 via the device-side transceiver 25. The portable terminal 51 and the device-side transceiver 25 are set to communicate at a distance of several centimeters or less. As a result, the association can be easily completed in the future.

Once the identification signal Si is inputted, the server 30 executes an operation command output control. The flow chart of FIG. 4 shows its steps.

When the operation command output control starts, in step S1 of FIG. 4, except that the laundry apparatus 20 is being used by another user, the server 30 associates the user terminal 51 with the laundry apparatus 20 based on the identification signal Si, and sends the identification signal to the user terminal 51 via the wireless LAN 40 in step S2. As shown in FIG. 5, in the user terminal 51 receiving the identification signal, a message 71 of "welcome, you are using No. 00 washing/drying machine, if possible, please touch YES" and a "YES" button 72 are displayed on a screen 51*a*.

In step S3, the server 30 determines whether the user touches the "YES" button 72. If the determination is yes, an operation course signal is sent to the user terminal 51 in step S4. As shown in FIG. 6, in the user terminal 51 receiving the operation course signal, "operation course" buttons 73 (73*a* to 73*d*) corresponding to the selected laundry apparatus 20 and an "ENTER" button 74 are displayed on the screen 51*a*. The user selects the desired "operation course" button 73 according to the type and quantity of clothing, and touches the "ENTER" button 74.

In step S5, the server 30 determines if the user touches the "ENTER" button 74. If the determination is yes, a fee signal is sent to the user terminal 51 in step S6. As shown in FIG. 7, in the user terminal 51 that receives the fee signal, a message 75 of "The use fee is 0000 yen, please put in clothing and close the cover", and a button 76 of "lock the cover", and a button 77 of "window to be opaque" are displayed on the screen 51a. When the user wants to lock the cover 23 during operation of the laundry apparatus 20 or to make the glass window 22 opaque, the "lock the cover" button 76 and the "window to be opaque" button 77 are selected (touched).

After confirming the use fee and selecting the "lock the cover" button 76 and the "window to be opaque" button 77, the user places the portable terminal 51 on the device-side transceiver 25. Then an operation request signal Sd is sent from the user terminal 51. The operation request signal Sd is inputted to the server 30 via the Internet 60. In step S7, the server 30 determines whether the user has inputted the operation request signal Sd. If the determination is yes, in step S8, fee processing is performed. Based on the above-mentioned payment information, the fee processing is performed by communicating with the credit card company via the Internet 60.

After completing the charging in step S8, in step S9, the server 30 determines whether the "lock the cover" button 76 is touched. If the determination is YES, in step S10, a command for locking the cover is outputted to the laundry apparatus 20. Next, in step S11, the server 30 determines whether the "window to be opaque" button 77 is touched. If the determination is yes, in step S12, a command for the window to be opaque is outputted to the laundry apparatus 20.

Then, in step S13, the server 30 outputs an operation start command to the laundry apparatus 20, and ends an operation start command control. The laundry apparatus 20 to which the operation start command is inputted starts operation in an operation mode selected by the user. At the same time, the cover 23 is locked and the glass window 22 is made opaque based on the request of the user.

The server 30 sends each command of the operation command output control and the result of the fee processing one by one to the manager terminal 52. Thus, the manager can recognize in real-time a utilization state and a sales amount of the laundry apparatus 20 in the laundry store 10.

(End Notice Processing)

When the laundry apparatus 20 starts operation, the server 30 performs end notice processing, and its steps are shown in a flow chart of FIG. 8. When the end notice processing is started, in step S31 of FIG. 8, the server 30 repeatedly determines whether or not it is 10 minutes before the end of the operation at a predetermined time interval. Then, if the determination is yes, in step S32, the server 30 sends a first end notice signal to the user terminal 51 via the Internet 60. As shown in FIG. 9, in the user terminal 51 receiving the first end notice signal, a message 91 indicating "10 minutes remaining" which is 10 minutes from the end of the operation is displayed on the screen 51a. At the same time, a ringtone is made at low volume. Furthermore, even if the user is outside the laundry 10, the user terminal 51 can also receive an end notice signal via the Internet 60 through a 3G line or a wireless LAN outside the store.

Next, in step S33, the server 30 repeatedly determines whether it is 5 minutes before the end of the operation at a predetermined time interval. Then, if the determination is yes, in step S34, the server 30 sends a second end notice signal to the user terminal 51. As shown in FIG. 10, in the user terminal 51 that receives the second end notice signal, a message 92 indicating "5 minutes remaining" which is 5 minutes from the end of the operation is flashing on the screen 51a. At the same time, ringtone and vibration functions are started.

Thus, the user at the external store and restaurant can also stop shopping and dining and return to the laundry 10 before the end of the operation of the laundry apparatus 20. The improvement of a utilization rate, etc., of the laundry apparatus 20 is achieved.

The server 30 executes the error processing of the steps shown in a flow chart of FIG. 11 in parallel with the operation command output control or the like from time to time.

(Error Processing)

When the error processing starts, in step S41 of FIG. 11, the server 30 repeatedly determines whether or not a wrong signal is inputted from the laundry apparatus 20 in the laundry store 10 at a predetermined time interval.

When some error occurs in the laundry apparatus 20 and the determination in step S41 is yes, in step S42, an error message 42 (what kind of error occurred on which laundry apparatus 20) is sent to the manager terminal 52 and a terminal (not shown in the figure) of a maintenance company. In step S43, an error signal is sent to the user terminal 51. As shown in FIG. 12, in the user terminal 51 receiving the error signal, a message 101 of "an error occurred, please cancel and remove clothing", and a "Cancel" button 102 are displayed on the screen 51a.

The manager and the maintenance company go to the laundry 10 according to the error message to stop the use of the laundry apparatus 20 and to perform repairs and other measures. In addition, the user touches the "Cancel" button 102 according to the screen displays of the user terminal 51.

Next, in step S44, the server 30 determines whether the "cancel" button 102 has been touched. In the period when the determination is no, the determination of step S44 is repeated. When the user touches the "Cancel" button 102 and the determination in step S44 is yes, the server 30 sends an operation stop signal to the laundry apparatus 20 in step S45.

In the laundry apparatus 20 that receives the operation stop signal, the washing drum and the drying drum stop rotating. If washing or rinsing is being performed, the lock of the cover 23 is released after draining. Thus, the user can remove clothing from the laundry apparatus 20 and perform washing and drying with other laundry apparatus 20.

Next, in step S46, the server 30 cancels (i.e., refunds) the charge in the fee processing, and ends the error processing.

(User Rank Processing)

When the user finishes using the laundry apparatus 20, the server 30 performs user rank processing every time. A flow chart of FIG. 13 shows the steps. When the user-rank processing starts, in step S51 of FIG. 13, the server 30 determines whether a point up condition of the user terminal 51 is satisfied. For example, the point up condition is satisfied when the user removes clothing within 5 minutes after the laundry apparatus 20 is stopped. When it is determined yes in step S51, in step S52, the server 30 increases a user score Pu of an initial value 10. Next, in step S53, the server 30 determines whether the user's score Pu reaches a rank-up value Pru (e.g., 15). When the determination is no, the processing ends.

When the user score Pu reaches the rank-up value Pru, and the determination in step S53 is yes, in step S54, the server 30 performs rank-up processing. That is, the server 30 allows the user having the user terminal 51 to reserve the laundry apparatus 20 and change the operation setting (adjust the washing time and the drying time), etc. At the same time, a rank-up signal is sent to the user terminal 51. As shown in FIG. 14, in the user terminal 51 that receives the rank-up signal, a message 105 of "congratulations on becoming an "advanced user", you can reserve laundry equipment and change operation settings, etc." is displayed on the screen 51a.

On the other hand, when the determination in step S51 is no, in step S55, the server 30 determines whether a point down condition is satisfied. For example, when the user does not take out clothing within 15 minutes after the laundry apparatus 20 is stopped (that is, when clothing is left for a long time), the point down condition is satisfied. When it is determined yes in step S55, in step S56, the server 30 decreases the user score Pu. Next, in step S57, the server 30 determines whether the user's score Pu has reached a rank-down value Prd (e.g., 5). When the determination is no, the processing ends.

When the user score Pu decreases to the rank-down value Prd, and the determination in step S57 is yes, in step S58, the server 30 executes rank-down processing. That is, the server 30 makes the user having the user terminal 51 unable to reserve the laundry apparatus 20 and change the operation setting (adjust the washing time and the drying time), etc. At the same time, a rank-down signal is sent to the user terminal 51. As shown in FIG. 15, in the user terminal 51 receiving the rank-down signal, a message 106 of "rank-down to a general user, unable to reserve laundry equipment and change operation settings, etc." is displayed on the screen 51a.

It is also determined as no in step S55, for example, when the user takes out clothing within approximately 10 minutes, neither the point up condition nor the point down condition is satisfied, the server 30 does nothing and ends the user rank processing. In the present embodiment, cases in which the user puts clothing are reduced by performing the user rank processing. The utilization rate of the laundry apparatus 20 is thereby increased.

Second Embodiment

Hereinafter, a second embodiment of the present invention will be described in detail with reference to FIG. 16 to FIG. 22. The second embodiment is characterized in that an operation request signal and the like from a portable terminal are sent by reading an identification code, and that fees are paid through a prepaid card.

(Configuration of the Second Embodiment)

Figure 16:
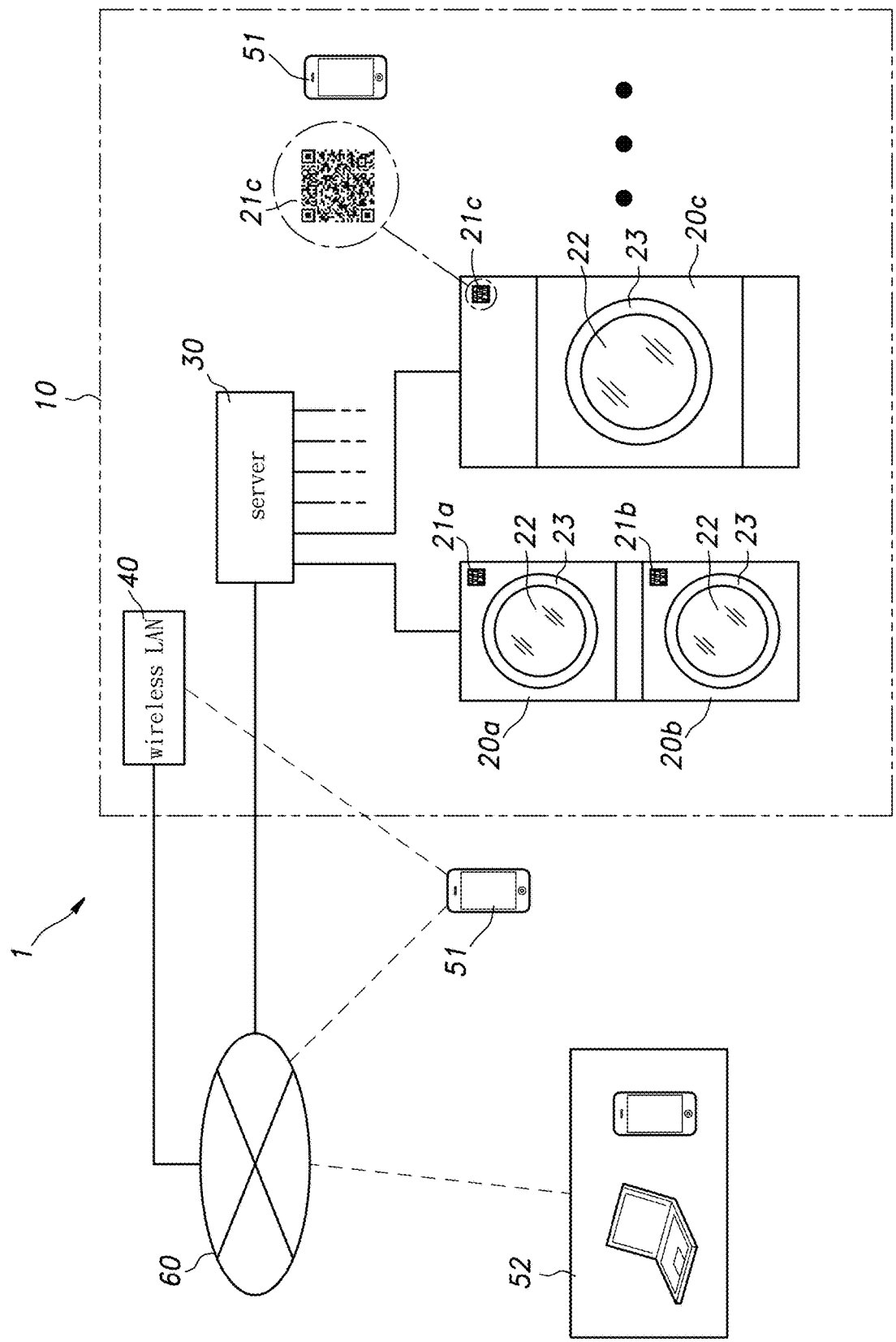
FIG. 16 is a schematic configuration diagram of a self laundry system of a second embodiment.

FIG. 16 is a schematic configuration diagram of a self laundry system of the second embodiment.

The hardware of the second embodiment employs the same configuration as the first embodiment, but the laundry apparatus 20 does not have a display for displaying a one-time password, and a transceiver, etc., for short-range wireless communication. As shown in FIG. 16, each laundry apparatus 20 is affixed with a label (hereinafter abbreviated as an identification code) 21 (21a, 21b, 21c . . . ) each having an inherent identification code printed thereon. Further, as an identification code, a two-dimensional code such as a QR code (registered trademark), etc., is preferable.

(The Effect of the Second Embodiment)

Figure 17:
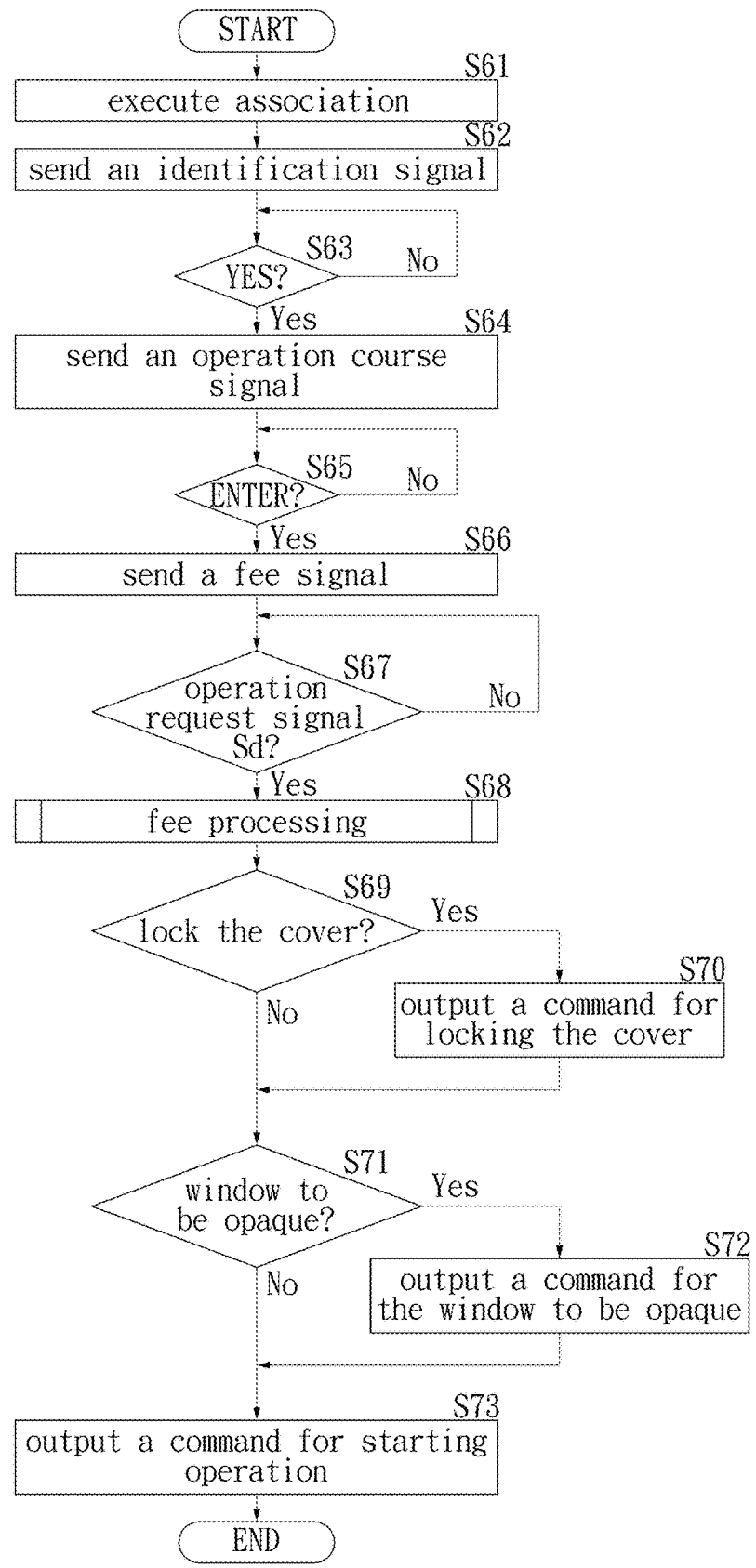
FIG. 17 is a flow chart showing steps of an operation command output control in the second embodiment.

FIG. 17 is a flow chart showing steps of an operation command output control in the second embodiment.

Figure 18:
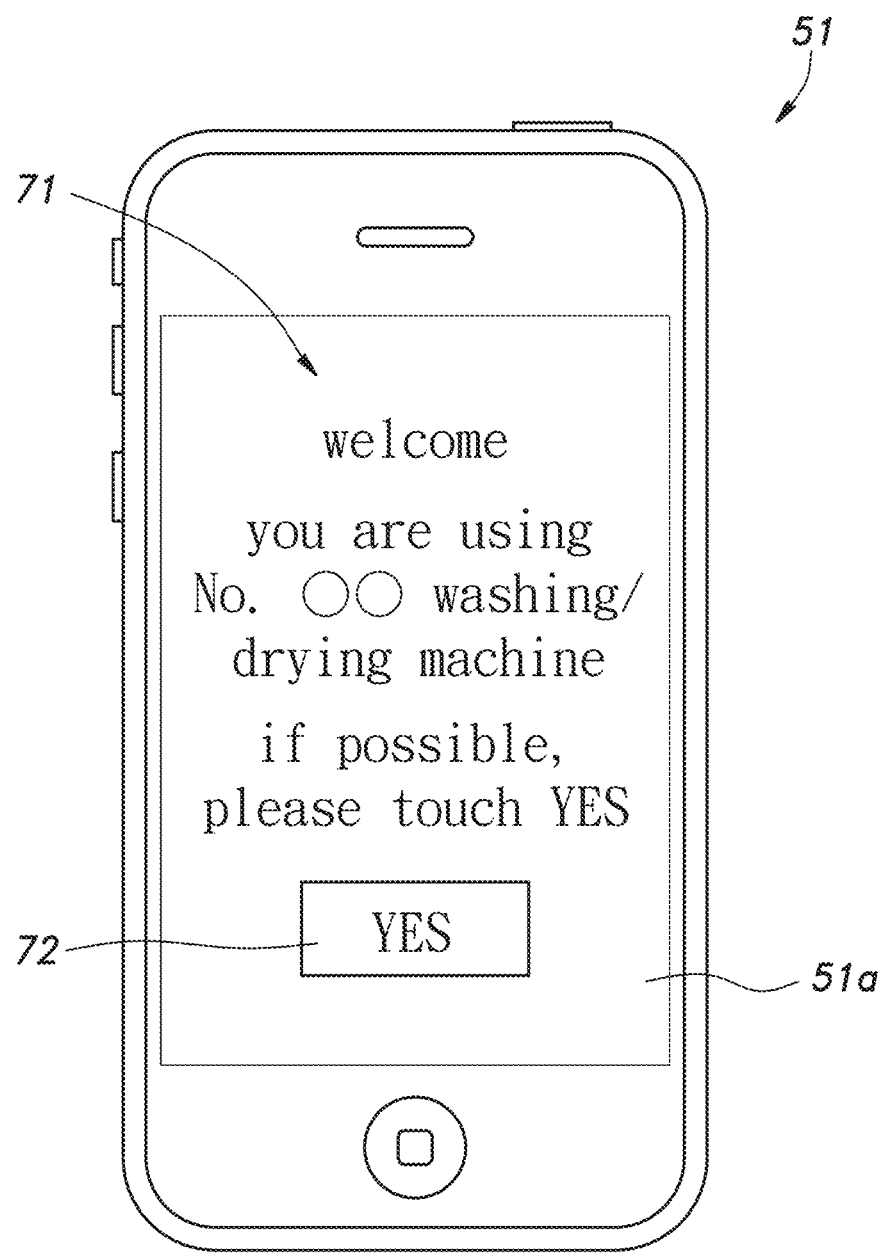
FIG. 18 is a schematic front view of a user terminal receiving an identification signal in the second embodiment.

FIG. 18 is a schematic front view of a user terminal receiving an identification signal in the second embodiment.

Figure 19:
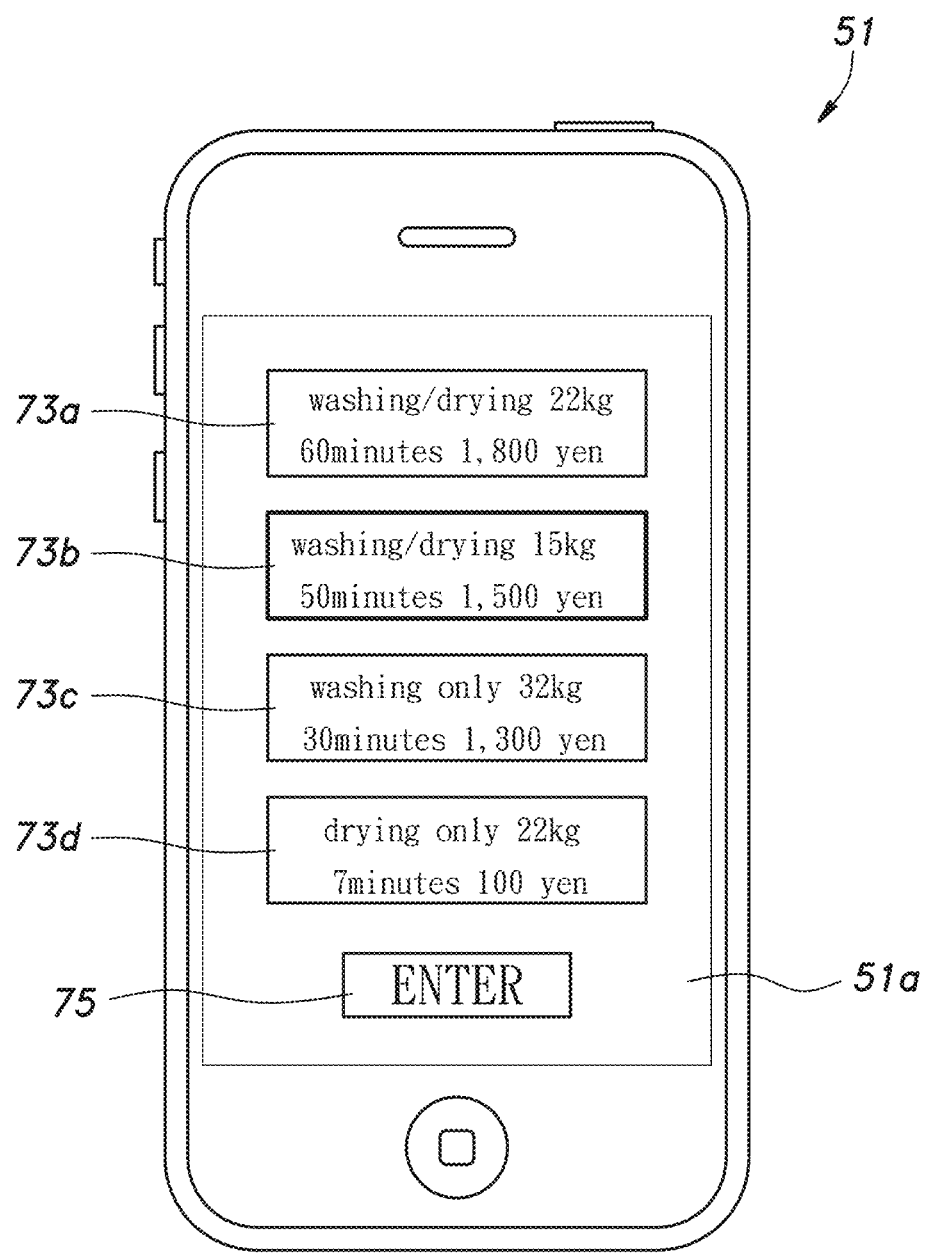
FIG. 19 is a schematic front view of a user terminal receiving an operation course signal in the second embodiment.

FIG. 19 is a schematic front view of a user terminal receiving an operation course signal in the second embodiment.

Figure 20:
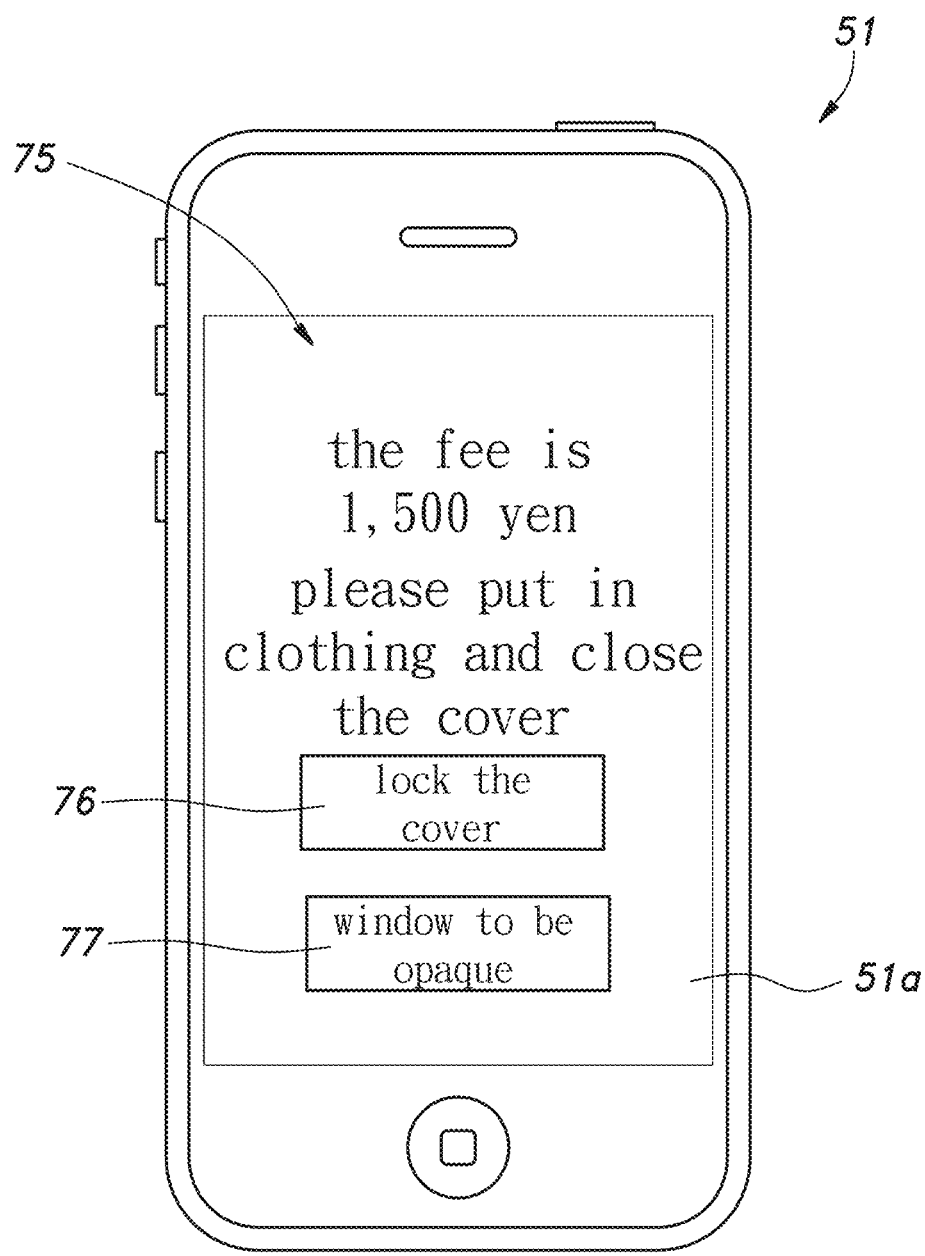
FIG. 20 is a schematic front view of a user terminal receiving a fee signal in the second embodiment.

FIG. 20 is a schematic front view of a user terminal receiving a fee signal in the second embodiment.

Figure 21:
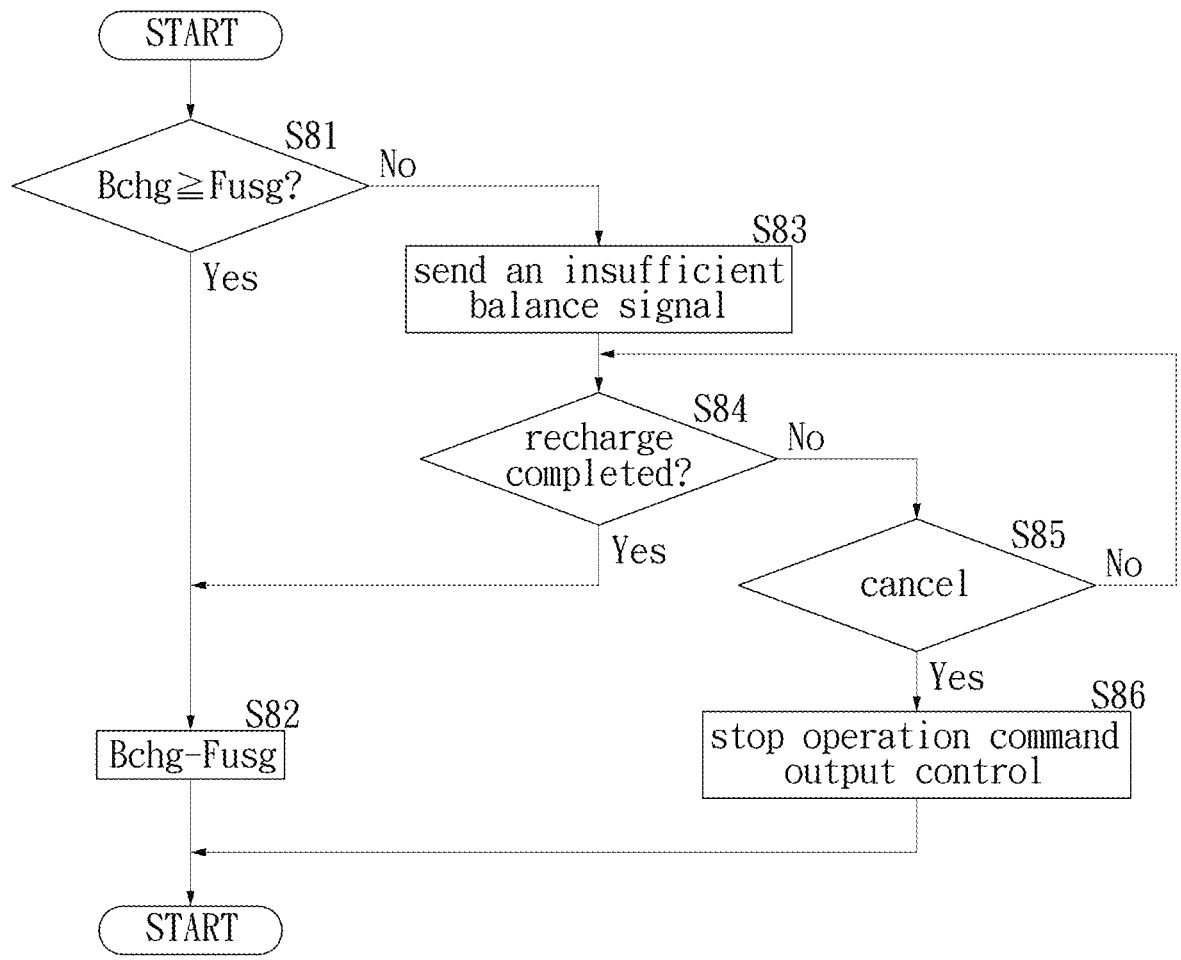
FIG. 21 is a flow chart showing steps of fee processing in the second embodiment.

FIG. 21 is a flow chart showing steps of fee processing in the second embodiment.

Figure 22:
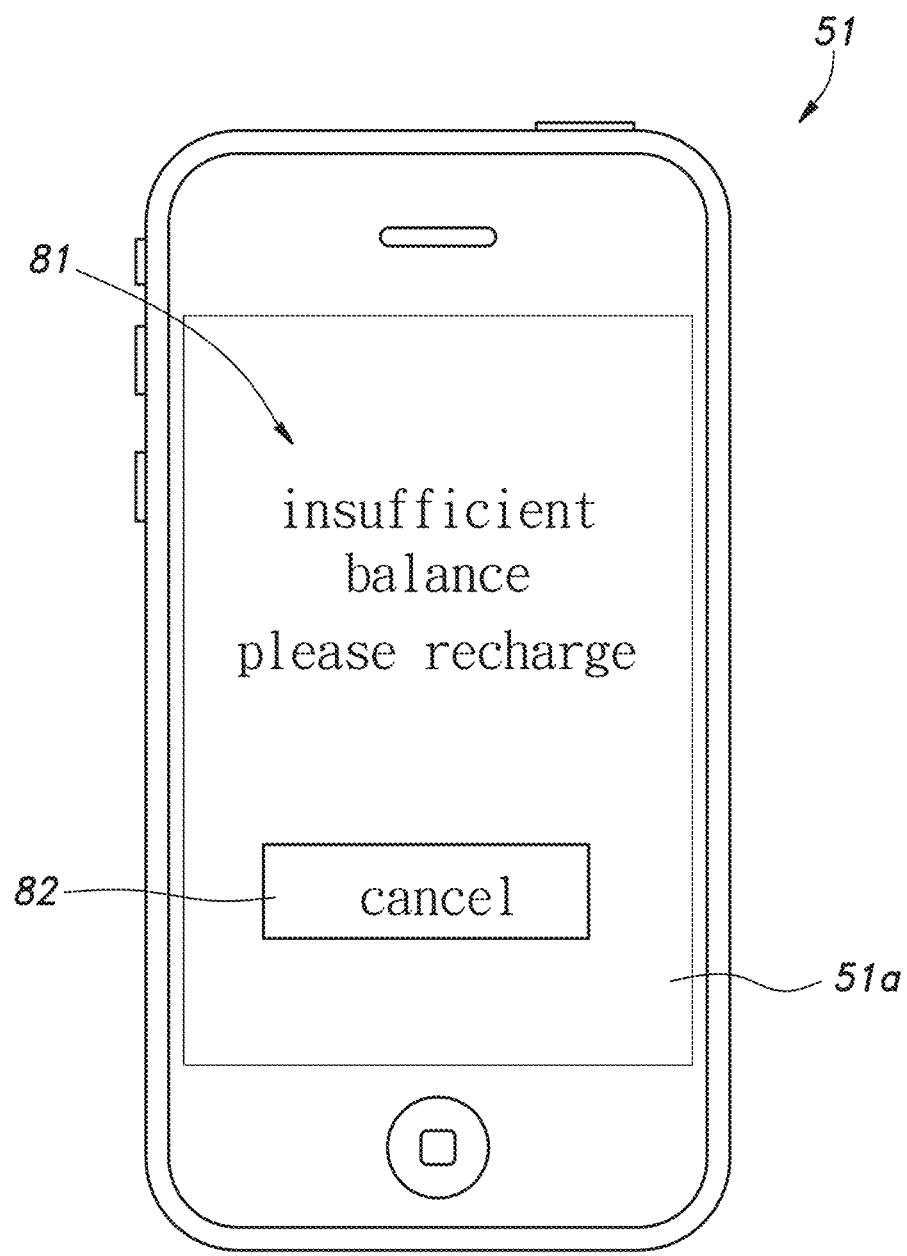
FIG. 22 is a schematic front view of a user terminal receiving an insufficient balance signal in the second embodiment.

FIG. 22 is a schematic front view of a user terminal receiving an insufficient balance signal in the second embodiment.

When first using the laundry apparatus 20 of the laundry 10, the user visits the homepage of the laundry 10 at home or in the laundry store 10, and downloads dedicated application software (hereinafter referred to as a dedicated application) corresponding to the self laundry system 1 to the user terminal 51.

Next, the user utilizes the user terminal 51 to perform user registration. The user registration refers to registering name and address, mobile phone number, and payment information (a prepaid card code) on the server 30. The prepaid card for payment may be inherent in the laundry store 10, or may also be an ordinary card sold at a convenience store or the like. When the user enters a prepaid card code, the face value of the prepaid card is stored in the server 30 as a recharge balance Bchg.

The user who comes to the laundry 10 selects the laundry apparatus 20 according to the kind and amount of clothing to be washed or dried. Next, the user utilizes the user terminal 51 to connect to the Internet via the wireless LAN 40 and starts the dedicated application. An identification code 21 of the laundry apparatus 20 is read by a built-in camera. The identification signal Si corresponding to the user terminal 51 and the laundry apparatus 20 is sent from the user terminal 51 reading the identification code 21. The identification signal Si is inputted to the server 30 via the Internet 60.

Once the identification signal Si is inputted, the server 30 executes an operation command output control. A flow chart of FIG. 17 shows its steps.

When the operation command output control starts, in step S61 of FIG. 17, except that the laundry apparatus 20 is being used by another user, the server 30 associates the user terminal 51 with the laundry apparatus 20 based on the identification signal Si, and in step S62, the identification signal is sent to the user terminal 51. As shown in FIG. 18, in the user terminal 51 receiving the identification signal, the message 71 of "welcome, you are using No. 00 washing/drying machine, if possible, please touch YES" and the "YES" button 72 are displayed on the screen 51a.

In step S63, the server 30 determines whether the user touches the "YES" button 72. If the determination is yes, an operation course signal is sent to the user terminal 51 in step S64. As shown in FIG. 19, in the user terminal 51 receiving the operation course signal, the "operation course" buttons 73 (73a to 73d) corresponding to the selected laundry apparatus 20 and the "ENTER" button 74 are displayed on the screen 51a. The user selects the desired "operation course" button 73 according to the type and quantity of clothing and touches the "ENTER" button 74.

In step S65, the server 30 determines whether the user touches the "ENTER" button 74. If the determination is yes, a fee signal is sent to the user terminal 51 in step S66. As shown in FIG. 20, in the user terminal 51 receiving the fee signal, the message 75 of "The use fee is 0000 yen, please put in clothing and close the cover", and the "lock the cover" button 76 and the "window to be opaque" button 77 are displayed on the screen 51a. When the user wants the laundry apparatus 20 to lock the cover 23 during operation or wants to make the glass window 22 opaque, the "lock the cover" button 76 and the "window to be opaque" button 77 are selected (touched).

After confirming the use fee and selecting the "lock the cover" button 76 and the "window to be opaque" button 77, the user reads again the identification code 21 of the laundry apparatus 20 through the built-in camera. The operation request signal Sd is sent from the user terminal 51 reading the identification code 21. The operation request signal Sd is inputted to the server 30 via the Internet 60.

In step S67, the server 30 determines whether the user has inputted the operation request signal Sd. If the determination is yes, in step S68, fee processing is performed. A flow chart of FIG. 21 shows its steps.

(Fee Processing)

When the fee processing is started, in step S81 of FIG. 21, the server 30 determines whether or not the user's recharge balance Bchg is greater than or equal to a usage fee Fusg. If the determination is yes, in step S82, charging is performed (the usage fee Fusg is subtracted from the recharge balance Bchg), and the fee processing ends.

When the determination in step S81 is no, in step S83, the server 30 sends an insufficient balance signal to the user terminal 51. As shown in FIG. 22, in the user terminal 51 receiving the insufficient balance signal, a message 81 of "insufficient balance, please recharge", and the "cancel" button 82 are displayed on the screen 51a.

If the user holds a prepaid card, a prepaid card code is entered. If the user does not hold a prepaid card, a prepaid card is purchased in the laundry store 10. On the other hand, if neither a prepaid card nor cash is available, the "Cancel" button 82 is touched.

In step S84, the server 30 determines whether the user has completed the prepaid card recharge. If the determination is yes, the process proceeds to step S82 for charging. On the other hand, when the determination in step S84 is no, in step S85, the server 30 determines whether the "cancel" button 82 is touched. During the period when the determination is no, the determination of step S85 is repeated.

When the user touches the "Cancel" button 82, and the determination in step S85 is yes, in step S86, the server 30 stops the operation command output control itself, and ends the fee processing.

After completing the charging in step S68, in step S69 of FIG. 17, the server 30 determines whether the "lock the cover" button 76 is touched. If the determination is yes, in step S70, a command to lock the cover is outputted to the laundry apparatus 20. Next, in step S71, the server 30 determines whether the "window to be opaque" button 77 has been touched. If the determination is yes, in step S72, a command for the window to be opaque is outputted to the laundry apparatus 20.

Then, in step S73, the server 30 outputs an operation start command to the laundry apparatus 20, and ends an operation start command control. The laundry apparatus 20, to which the operation start command is inputted, starts operation in an operation mode selected by the user. At the same time, the cover 23 is locked and the glass window 22 is made opaque based on the user's request.

The server 30 sends each command of the operation command output control and the result of the fee processing one by one to the manager terminal 52. Thus, the manager can recognize in real-time the utilization state and the sales amount of the laundry apparatus 20 in the laundry store 10.

When the laundry apparatus 20 starts operation, like the first embodiment, the server 30 executes the end notice processing of which the steps are shown in a flow chart of FIG. 8, and the error processing of which the steps are shown in a flow chart of FIG. 11.

Third Embodiment

Hereinafter, a third embodiment of the present invention will be described in detail with reference to FIG. 23 to FIG. 27. The third embodiment is characterized in that transmission is performed from a portable terminal through the user's key operation (touching a screen), and that the fees are paid by credit card.

In addition, since the hardware of the third embodiment has the same configuration as that of the second embodiment, its description is omitted.

(The Effect of the Third Embodiment)

Figure 23:
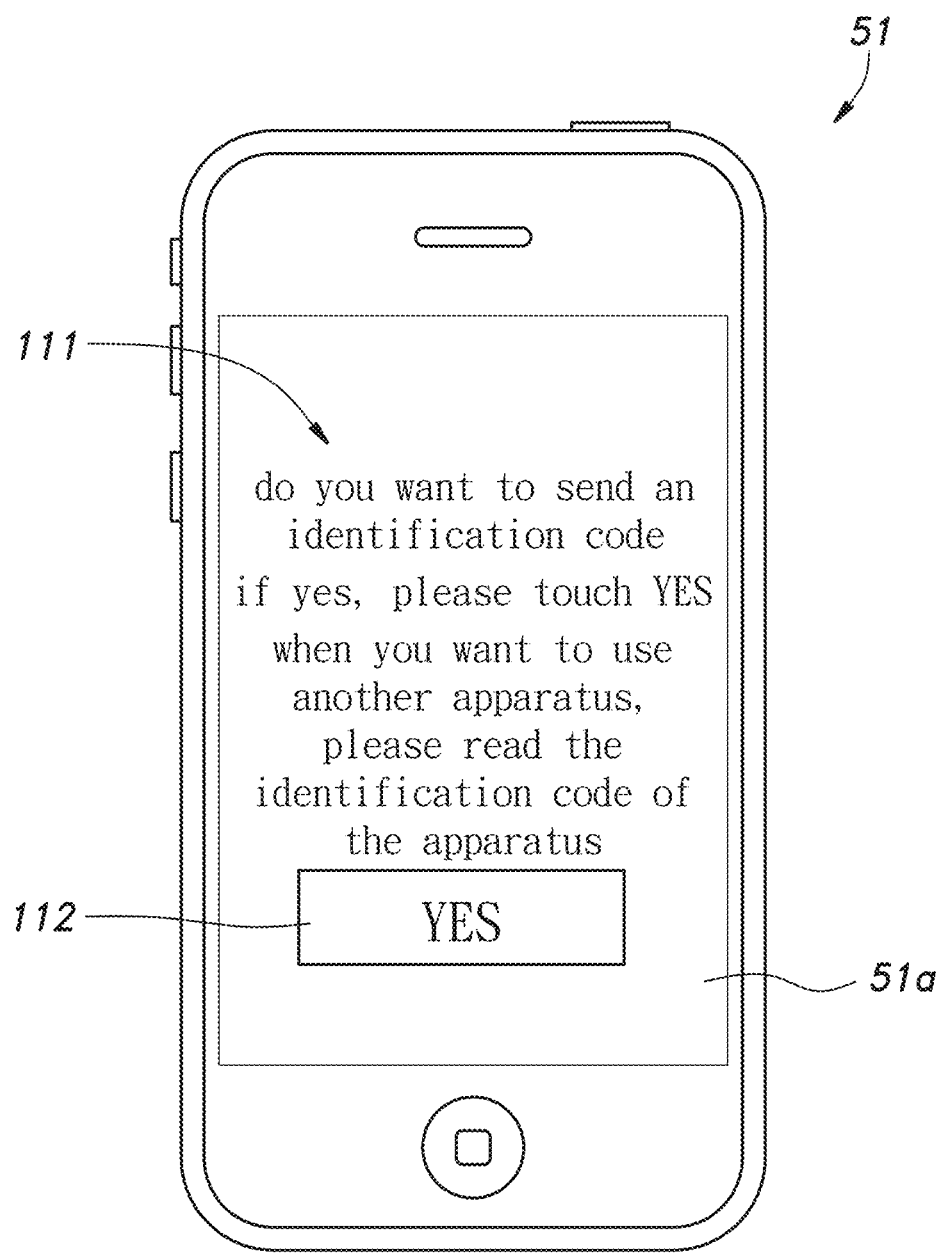
FIG. 23 is a schematic front view of a user terminal reading an identification code in a third embodiment.

FIG. 23 is a schematic front view of a user terminal reading an identification code in the third embodiment.

Figure 24:
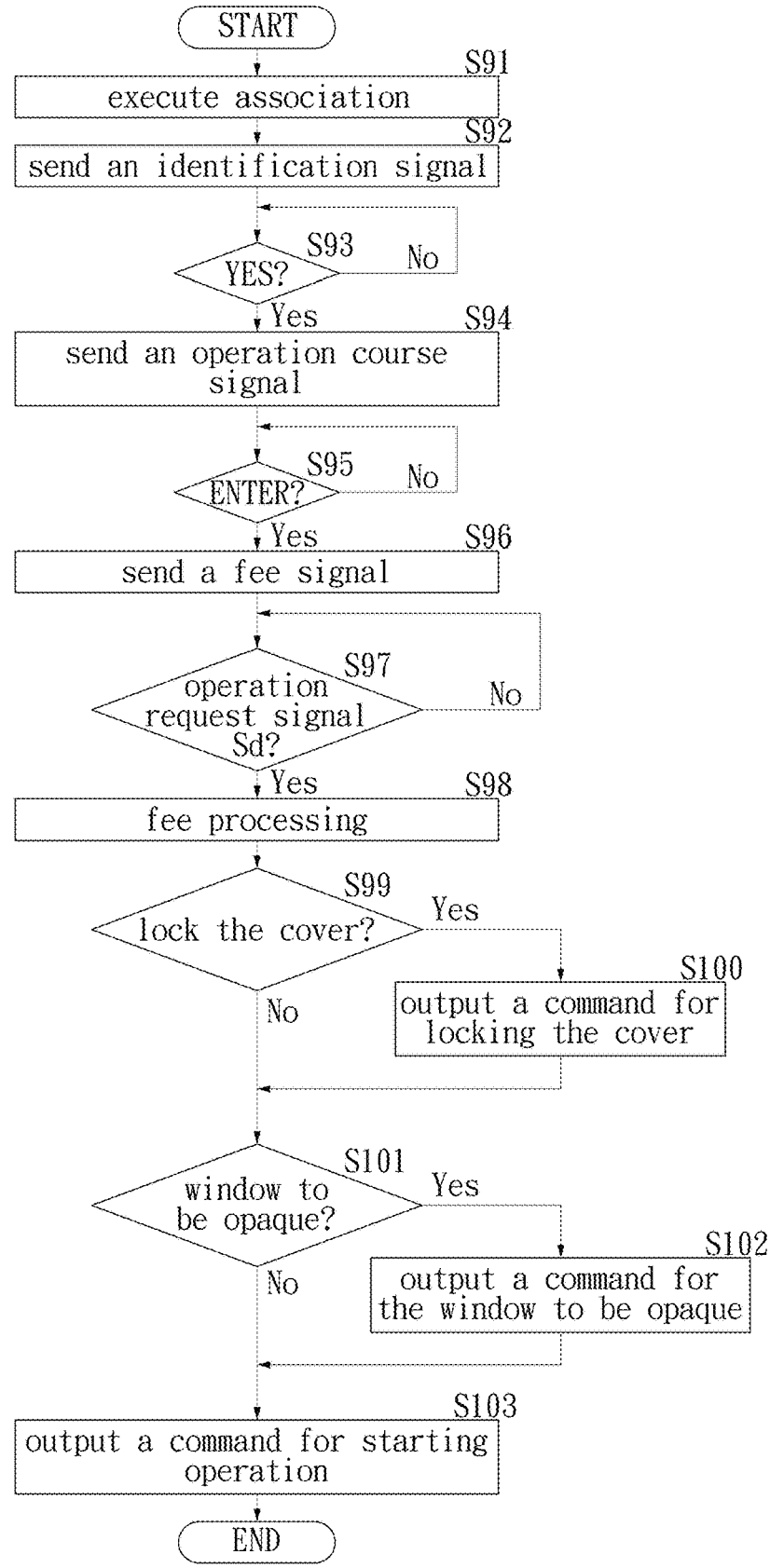
FIG. 24 is a flow chart showing steps of an operation command output control in the third embodiment.

FIG. 24 is a flow chart showing steps of an operation command output control in the third embodiment.

Figure 25:
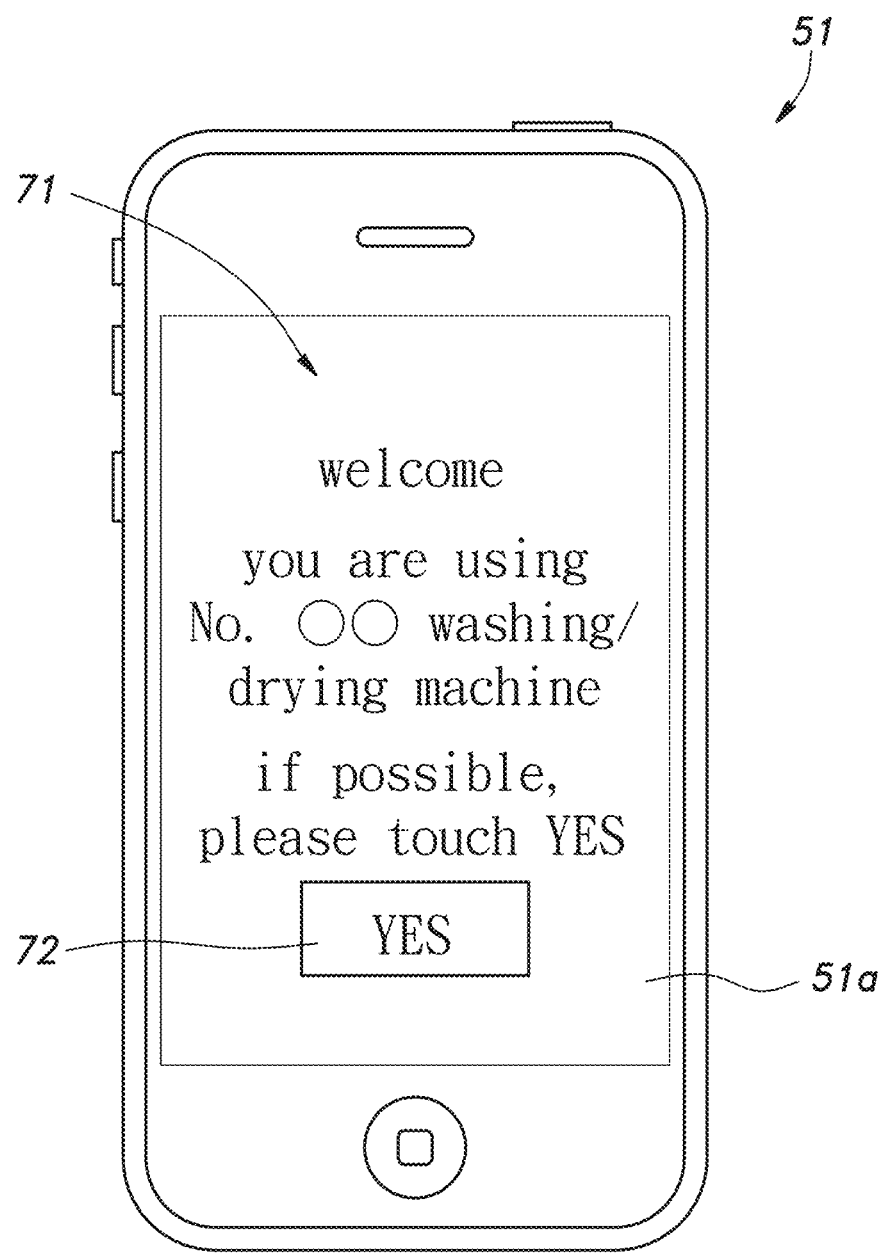
FIG. 25 is a schematic front view of a user terminal receiving an identification signal in the third embodiment.

FIG. 25 is a schematic front view of a user terminal receiving an identification signal in the third embodiment.

Figure 26:
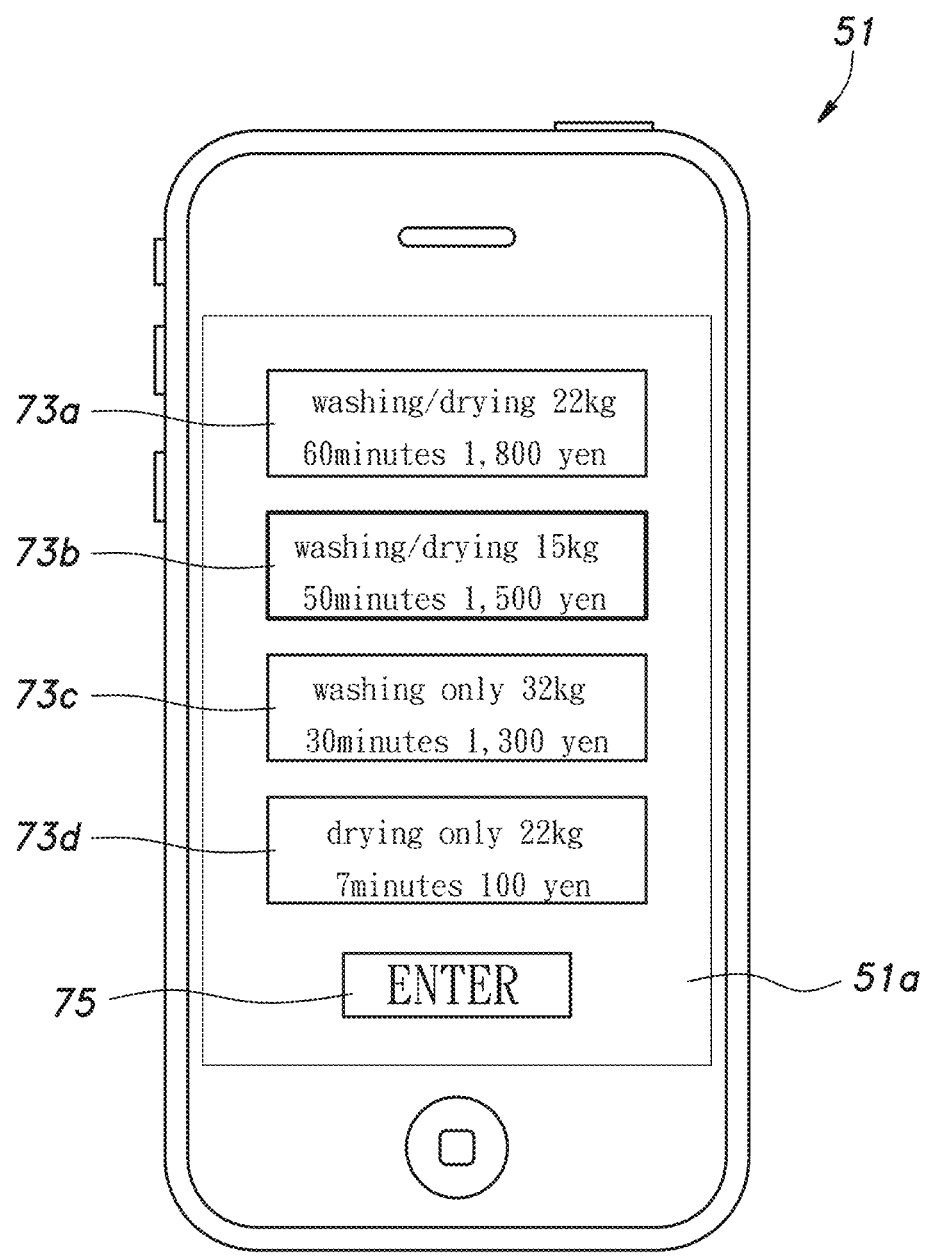
FIG. 26 is a schematic front view of a user terminal receiving an operation course signal in the third embodiment.

FIG. 26 is a schematic front view of a user terminal receiving an operation course signal in the third embodiment.

Figure 27:
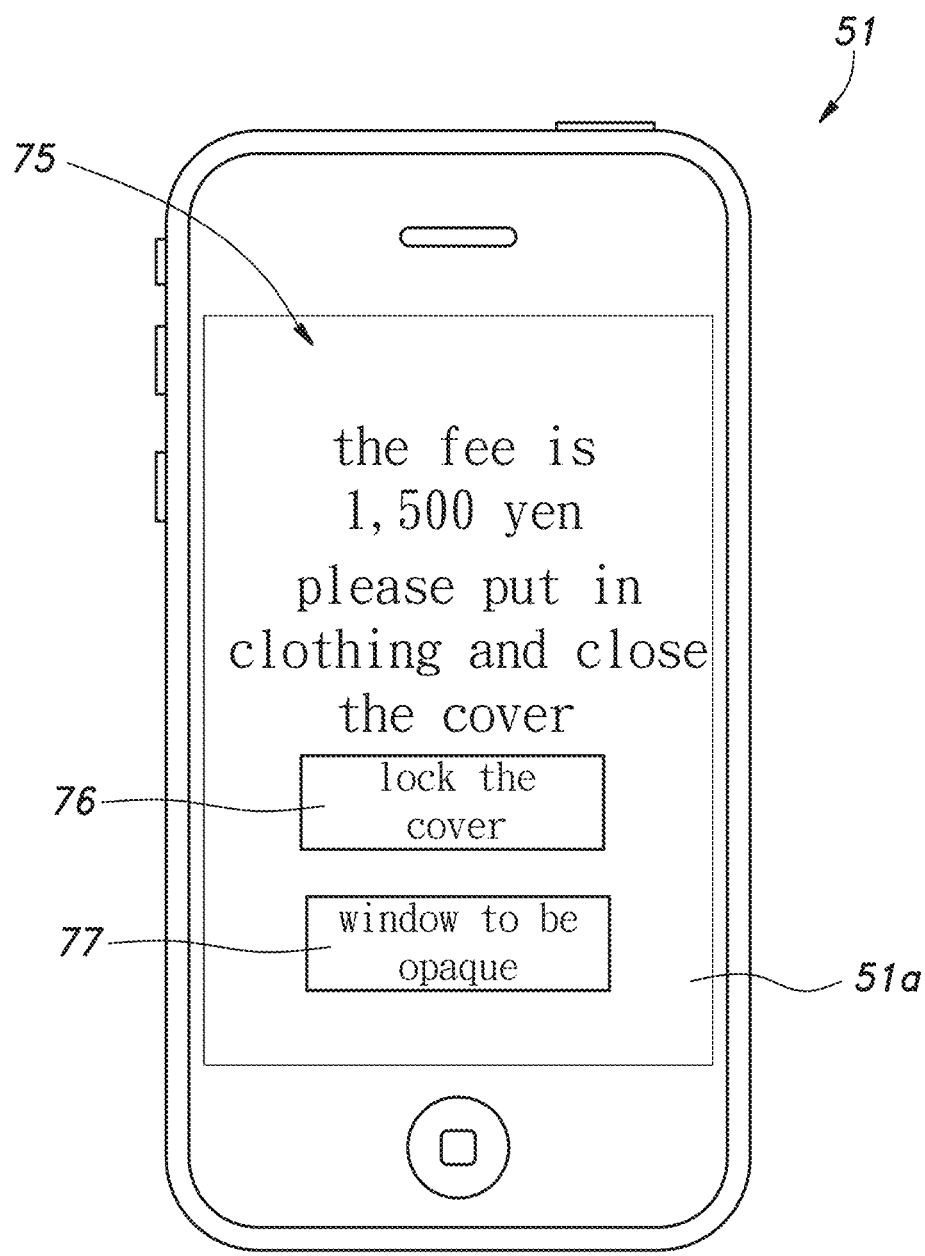
FIG. 27 is a schematic front view of a user terminal receiving a fee signal in the third embodiment.

FIG. 27 is a schematic front view of a user terminal receiving a fee signal in the third embodiment.

When first using the laundry apparatus 20 of the laundry 10, the user visits the homepage of the laundry 10 at home or in the laundry store 10, and downloads dedicated application software (hereinafter referred to as a dedicated application) corresponding to the self laundry system 1 to the user terminal 51.

Next, the user utilizes the user terminal 51 to perform user registration. The user registration means registering name and address, mobile phone number, and payment information (credit card information) in the server 30.

The user who comes to the laundry 10 selects the laundry apparatus 20 according to the kind and amount of clothing to be washed or dried. Next, the user utilizes the user terminal 51 to connect to the Internet and starts the dedicated application. The identification code 21 of the laundry apparatus 20 is read through a built-in camera.

As shown in FIG. 23, in the user terminal 51 reading the identification code 21, a message 111 of "do you want to send an identification code? if yes, please touch YES, when you want to use another apparatus, please read the identification code of the apparatus" and a "YES" button 112 are displayed on the screen 51a.

When the user touches the "YES" button 112, the identification signal Si corresponding to the user terminal 51 and the laundry apparatus 20 is sent from the user terminal 51. The identification signal Si is inputted to the server 30 via the Internet 60 through the wireless LAN 40.

Once the identification signal Si is inputted, the server 30 executes an operation command output control. A flow chart of FIG. 24 shows its steps.

When the operation command output control is started, in step S91 of FIG. 24, except that the laundry apparatus 20 is being used by another user, the server 30 associates the user terminal 51 with the laundry apparatus 20 based on the identification signal Si. And in step S92, an identification signal is sent to the user terminal 51. As shown in FIG. 25, in the user terminal 51 receiving the identification signal, the message 71 of "welcome, you are using No. 00 washing/drying machine, if possible, please touch YES" and the "YES" button 72 are displayed on the screen 51a.

In step S93, the server 30 determines whether the user touches the "YES" button 72. If the determination is yes, in step S94, an operation course signal is sent to the user terminal 51. As shown in FIG. 26, in the user terminal 51 receiving the operation course signal, the "operation course" buttons 73 (73a to 73d) corresponding to the selected laundry apparatus 20 and the "ENTER" button 74 are displayed on the screen 51a. The user selects the desired "operation course" button 73 according to the type and quantity of clothing and touches the "ENTER" button 74.

In step S95, the server 30 determines whether the user touches the "ENTER" button 74. If the determination is yes, in step S96, a fee signal is sent to the user terminal 51. As shown in FIG. 27, in the user terminal 51 that receives the fee signal, the message 75 of "The use fee is 0000 yen, please put in clothing and close the cover", and the "lock the cover" button 76, the "window to be opaque" button 77, and the "start operation" button 78 are displayed on the screen 51a. When the user wants the laundry apparatus 20 to lock the cover 23 during operation or wants to make the glass window 22 opaque, the "lock the cover" button 76 and the "window to be opaque" button 77 are selected (touched).

After confirming the use fee and selecting the "lock the cover" button 76 and the "window to be opaque" button 77, the user touches the "start operation" button 78. The operation request signal Sd is sent from the user terminal 51 in which the "start operation" button 78 is touched. The operation request signal Sd is inputted to the server 30 via the Internet 60.

In step S97, the server 30 determines whether the user has inputted the operation request signal Sd. If the determination is yes, in step S98, fee processing is performed. Based on the above-mentioned payment information, the fee processing is performed by communicating with a credit card company via the Internet 60.

After completing the charging in step S98, in step S99, the server 30 determines whether the "lock the cover" button 76 is touched. If the determination is yes, in step S100, a command to lock the cover is outputted to the laundry apparatus 20. Next, in step S101, the server 30 determines whether the "window to be opaque" button 77 is touched. If the determination is yes, in step S102, a command for the window to be opaque is outputted to the laundry apparatus 20.

Then, in step S103, the server 30 outputs an operation start command to the laundry apparatus 20, and ends the operation start command control. The laundry apparatus 20, to which the operation start command is inputted, starts operation in an operation mode selected by the user. At the same time, the cover 23 is locked and the glass window 22 is made opaque based on the user's request.

The server 30 sends each command of the operation command output control and the result of the fee processing one by one to the manager terminal 52. Thus, the manager can recognize in real-time the utilization state and the sales amount of the laundry apparatus 20 in the laundry store 10.

When the laundry apparatus 20 starts operation, like the first embodiment, the server 30 executes the end notice processing of which the steps are shown in the flow chart of FIG. 8, and the error processing of which the steps are shown in the flow chart of FIG. 11.

In the above, although the description of the specific embodiments is complete, the form of the present invention is not limited thereto. For example, although settlement is performed by a credit card in the first embodiment and the third embodiment, it may also be performed by a prepaid card, a debit card, a mobile phone utilization fee, and the like. In addition, although the settlement is performed by the prepaid card in the second embodiment, it may also be performed by a credit card, a debit card, a mobile phone utilization fee, and the like. In addition, a score is assigned to each use of the laundry apparatus, which may be used as part of substitute money for usage. In addition, the user can connect to the Internet at home or the like and start a dedicated application to confirm the available information of the laundry apparatus. In addition, as long as it is within a range without deviating from the gist of the present invention, the specific configuration of the self laundry system and the specific steps of the operation command output control can be appropriately changed.

INDUSTRIAL USE POSSIBILITIES

The self laundry system of the present invention can be effectively used in self laundries set up in the city.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A self laundry system, comprising:
a plurality of laundry apparatuses, disposed in a laundry store, having at least one of a washing function and a drying function, and each having an inherent identification mark; and
a control device, communicating with a portable terminal of a user and controlling operation of the laundry apparatuses according to a communication result between the control device and the portable terminal of the user, wherein the control device has:
an association means, associating the portable terminal with one of the laundry apparatuses based on an identification signal from the portable terminal; and
an operation command output means, outputting an operation command to the laundry apparatus associated with the portable terminal based on an operation request signal from the portable terminal,
wherein each one of the laundry apparatuses has a locking means for locking a cover, and the control device has a locking command means for outputting a cover locking command to one of the laundry apparatuses based on a cover locking request from the portable terminal; and
each one of the laundry apparatuses has a glass window that can be switched transparent/opaque, and the control device switches the glass window to opaque based on a request for the window to be opaque from the portable terminal.

2. The self laundry system according to claim 1, wherein input of a one-time password inputted to the portable terminal by the user is requested when the association means associates the portable terminal with one of the laundry apparatuses.

3. The self laundry system according to claim 2, wherein the identification mark is a two-dimensional code for photographing by the portable terminal.

4. The self laundry system according to claim 2, wherein communication between the portable terminal and the control device is performed via an Internet.

5. The self laundry system according to claim 2, wherein the control device has an end notification means, for sending a notification to the portable terminal about an end of operation of one of the laundry apparatuses.

6. The self laundry system according to claim 1, wherein the identification mark is a two-dimensional code for photographing by the portable terminal.

7. The self laundry system according to claim 1, wherein communication between the portable terminal and the control device is performed via an Internet.

8. The self laundry system according to claim 1, wherein the control device has an end notification means, for sending a notification to the portable terminal about an end of operation of one of the laundry apparatuses.

9. A self laundry system, comprising:
- a plurality of laundry apparatuses, disposed in a laundry store, and having at least one of a washing function and a drying function; and
- a control device, communicating with a portable terminal of a user and controlling operation of the laundry apparatuses according to a communication result between the control device and the portable terminal of the user, wherein the control device has:
  - an association means, associating the portable terminal with one of the laundry apparatuses; and
  - an operation command output means, outputting an operation command to the laundry apparatus associated with the portable terminal based on an operation request signal from the portable terminal, wherein the association means conducts association between the portable terminal and the laundry apparatus associated with the portable terminal based on very close-range communication, and the control device receives an operation request signal inputted from the portable terminal by using a communication means different from the very close-range communication,
- wherein each one of the laundry apparatuses has a locking means for locking a cover, and the control device has a locking command means for outputting a cover locking command to one of the laundry apparatuses based on a cover locking request from the portable terminal; and
- each one of the laundry apparatuses has a glass window that can be switched transparent/opaque, and the control device switches the glass window to opaque based on a request for the window to be opaque from the portable terminal.

* * * * *